US012458757B2

(12) United States Patent
Cords et al.

(10) Patent No.: US 12,458,757 B2
(45) Date of Patent: Nov. 4, 2025

(54) AUTOMATED SYRINGE FILL STATE MEASUREMENT

(71) Applicant: Augmenticon AG, Glattbrugg (CH)

(72) Inventors: Hilko Cords, Windisch (CH); Yves Simmen, Windisch (CH); Matthias Friebe, Glattbrugg (CH); Christian Schmidt, Glattbrugg (CH)

(73) Assignee: Augmenticon AG, Glattbrugg (CH)

( * ) Notice: Subject to any disclaimer, the term of this patent is extended or adjusted under 35 U.S.C. 154(b) by 0 days.

(21) Appl. No.: 19/099,463

(22) PCT Filed: Apr. 4, 2023

(86) PCT No.: PCT/EP2023/058792
§ 371 (c)(1),
(2) Date: Jan. 28, 2025

(87) PCT Pub. No.: WO2024/022624
PCT Pub. Date: Feb. 1, 2024

(65) Prior Publication Data
US 2025/0256035 A1    Aug. 14, 2025

(30) Foreign Application Priority Data
Jul. 29, 2022 (GB) ..................................... 2211146

(51) Int. Cl.
*A61M 5/31* (2006.01)
*A61M 5/00* (2006.01)
(Continued)

(52) U.S. Cl.
CPC .......... *A61M 5/3129* (2013.01); *A61M 5/002* (2013.01); *G01F 22/00* (2013.01); *G06T 7/60* (2013.01); *A61M 2205/3379* (2013.01)

(58) Field of Classification Search
None
See application file for complete search history.

(56) References Cited

U.S. PATENT DOCUMENTS

| | | | |
|---|---|---|---|
| 2009/0188311 A1* | 7/2009 | Cadieux | A61M 5/14546 73/149 |
| 2018/0108435 A1* | 4/2018 | Brown | G01F 22/00 |

(Continued)

OTHER PUBLICATIONS

Regmi, H.K., Nesamony, J., Pappada, S.M et al. A System for Real-Time Syringe Classification and Volume Measurement Using a Combination of Image Processing and Artificial Neural Networks. J Pharm Innov 14, 341-358 (2019) https://doi.org/10.1007/s12247-018-9358-5, Published online: Oct. 22, 2018.

*Primary Examiner* — Eric S. McCall
*Assistant Examiner* — Nigel H Plumb
(74) *Attorney, Agent, or Firm* — Nemphos Braue LLC; Michael Antone

(57) ABSTRACT

A method and apparatus for measuring the volume of liquid contained in a syringe having a barrel with a barrel flange and a barrel bottom surface and plunger with a plunger flange. An image of the syringe is captured and processed to determine a length dimension of the syringe that is characteristic of its model. The length dimension determined from the image processing is used to look up the syringe model in a dataset that stores the relevant length dimension for each syringe model. The dataset also stores, for each syringe model, calibration values representing the volume of liquid contained in the syringe at each of at least two plunger positions. The volume of liquid held in the syringe is determined from the plunger position obtained by processing the image to determine the distance between the barrel flange or barrel bottom surface and plunger flange and the calibration values.

19 Claims, 12 Drawing Sheets

(51) Int. Cl.
 *G01F 22/00* (2006.01)
 *G06T 7/60* (2017.01)

(56) References Cited

U.S. PATENT DOCUMENTS

| | | | |
|---|---|---|---|
| 2018/0169327 A1* | 6/2018 | Iddon | A61M 5/14546 |
| 2019/0156697 A1* | 5/2019 | Trovato | G06K 7/1413 |
| 2020/0089989 A1* | 3/2020 | Jones | G06T 3/04 |

\* cited by examiner

AUTOMATED SYRINGE FILL STATE MEASUREMENT

BACKGROUND OF THE INVENTION

The invention relates to methods and apparatus for determining the volume of liquid contained in a syringe.

Dispensing liquids from syringes is carried out in a variety of medical and scientific applications. For example, complex chemical syntheses will often involve use of one or more liquid reagents. The liquid reagents may be provided in syringes, each being filled to contain the correct amount of the liquid needed for the synthesis. Such syringes can be used manually or in combination with syntheses-machines (i.e. modules) frequently applied in laboratory and pharmaceutical manufacturing environments. The liquid is then dispensed from the syringe at the appropriate step of the chemical synthesis. A synthesis module can be used which accommodates cassettes fitted with valves on which the syringes can be docked. An operator carrying out the chemical synthesis is responsible for filling the correct amount of liquid into each syringe prior to attaching it to the correct docking position on the cassette or directly adding it to a reaction mixture. Docking to the cassette can be done directly via the syringe tip, which is formed as a luer connection, or via a connecting tube.

FIG. 1 is a schematic drawing of an example syringe 100. A syringe has as its main components a barrel 110 and plunger 120. The barrel 110 is cylindrical with a wall thickness that defines inner and outer cylindrical surfaces 114, 115 respectively. The barrel 110 terminates in a tip 111 which provides an outlet channel 117 for passage of liquid. The tip 111 is typically formed as a luer lock. The barrel 110 has at the opposite end to the tip 111 a barrel flange 112 which is provided to aid holding between the index and middle fingers. The barrel 110 also has scale marks 113 on its outer cylindrical surface to allow the volume of liquid contained in the syringe 100 to be read off by an operator. The plunger 120 is slidably fitted in the barrel 110. Up and down sliding action of the plunger 120 within the barrel 110 along the principal axis of the syringe 100 allows liquid to be drawn into and expelled from the syringe 100. The plunger 120 has a main body 121 terminating at one end with a plunger flange 122, which is provided to facilitate withdrawal of the plunger 120 by the index and middle fingers (for charging the syringe) and also to provide an end surface that is easily depressed by the thumb (for discharging the syringe). The plunger 120 is terminated at its other end with a stopper 123 that forms a liquid tight seal with the inner surface of the barrel 110. The stopper 123 is made of resilient material, i.e. rubber or rubber-like material and is usually black in colour to provide good visual contrast with the scale marks 113 on the barrel 110. Typically, the stopper 123 has upper and lower sealing surfaces 124, 125 which provide two spaced apart horizontal liquid-tight seals with the inner surface 114 of the barrel 110. The volume of liquid contained in the syringe 100 is read from the alignment of the lower sealing surface 125 of the stopper 123 on the scale marks 113.

FIG. 2 is a schematic drawing of an example synthesis module 130 as used in laboratory and pharmaceutical manufacturing environments. The synthesis module 130 comprising a single cassette 131 with five three-way valves 132. More generally multiple cassettes may be provided with interconnecting tubing between them. Moreover, valves may be specified with different numbers of ways, e.g. 2, 3 or 4, as desired. Syringes 100 and liquid connection lines 133 (e.g. tubing) are arranged by the operator as desired for the appropriate flow and dispensing of the liquid reagents and liquid reaction products in order to perform a particular synthesis. A tube 133 is shown that provides liquid flow connection between one of the valves 132 and an externally connected syringe 100. Three further syringes 100 are directly attached to respective valves 132 via their luer connections 111. A vial 134 is also shown which is connected by a tube 133 to another valve 132 to collect reaction product from the synthesis. The syringes 100 may be of different sizes as needed to hold a specified volume of each reagent or other liquid. Each syringe manufacturer offers syringe models in a range of different sizes, which are defined by their maximum foreseen liquid volume, which we refer to as the nominally specified syringe volume. A set of syringes may consist of syringes of nominally specified syringe volumes such as 1, 3, 5, 10, 20 and 30 mL.

In many production environments, e.g. for food production or for pharmaceutical manufacturing, process control is of critical importance. Manufacturing of pharmaceuticals is performed according to and controlled by formal regulations, instructing the operator on how to perform the tasks which collectively implement the chemical and physical steps leading to a finished pharmaceutical product. Such regulations are usually complied with through a Master Batch Record (MBR), a document generated by the holder of the Marketing Authorisation (MA) or the sponsor of a study to ensure compliance with established procedures, granted marketing approvals and sometimes also intellectual property licenses.

Completion of an MBR during manufacturing of a batch is akin to filling out a complicated form full of check boxes and other entries. A completed MBR is referred to as a batch record (BR), i.e. a BR is a completed MBR for a specific batch. The BR has the role of documenting the full process from preparatory work via the setup of the campaign, the execution of the process, equipment cleaning procedures between batches or during a batch and dispensing procedures. The batch manufacturing process steps will typically comprise a mixture of chemical and physical process steps and verification steps for quality control, such as taking measurements. The measurements will include basic physical parameter measurements including volume measurements of liquid dispensed from syringes.

In this context, it is undesirable to rely on a measurement of the volume of a liquid contained in a syringe that the operator has read off the scale marks on the syringe barrel. Rather, it would be desirable to provide an automated machine measurement of the volume of liquid in a syringe. The value determined by such an automated measurement could then be checked against a specification. Moreover, a value determined by the automated measurement could be entered into the BR instead of using a manual entry by the operator based on the operator's visual reading from the scale marks.

US 2019/156697 A1 discloses an infrared camera system for automated measurement of the volume of liquid in a syringe. A digital infrared camera is used to acquire an image of a syringe and the image is processed first to determine the size of the syringe and from that the syringe model by look-up to stored dimensions of different syringe models. The volume of liquid held in the syringe is then calculated by determining the position of the plunger and applying that to the known dimensions of the syringe model.

Regmi, H. K., Nesamony, J., Pappada, S. M. et al. A System for Real-Time Syringe Classification and Volume Measurement Using a Combination of Image Processing and Artificial Neural Networks. *J Pharm Innov* 14, 341-358 (2019) https://doi.org/10.1007/s12247-018-9358-5 provides an automated measurement of the volume of liquid in a syringe. A coloured cap is arranged over the tip of the syringe. An image of the syringe is acquired and then subject to image processing. The image processing identifies the location of the coloured cap. The image processing also segments out of the image the pixels representing the liquid column, which can be facilitated through the use of coloured liquid. The distance between the bottom of the segmented-out liquid column and the coloured tip cap are then used to determine the volume of liquid held in the syringe.

SUMMARY OF THE INVENTION

According to one aspect of the invention there is provided a method of measuring the volume of liquid contained in a syringe comprising a barrel with a barrel flange and a barrel bottom surface, and a plunger with a plunger flange, the method comprising:
  providing a dataset storing, for each of a number of syringe models, syringe manufacturer, nominally specified syringe volume, at least one length dimension and at least one calibration value to permit the volume of liquid contained in each syringe model to be computed as a function of plunger position in the barrel;
  presenting the syringe to an image acquisition device;
  capturing an image of the syringe with the image acquisition device;
  computer processing the image to determine a length dimension of the syringe and to identify the plunger position, wherein the plunger position is determined by computer processing the image to identify the plunger flange and either the barrel flange or the barrel bottom surface and then determining the distance therebetween;
  referring to the dataset to identify the syringe model based on the length dimension; and
  referring to the dataset to obtain the calibration values for the identified syringe model and then to determine the volume of liquid contained in the syringe from the plunger position and interpolation between the calibration values.

The above-described method of measurement of liquid volume in a syringe allows immediate feedback to be given to the operator during the performance of a synthesis or other protocol. It can be confirmed or denied that the volume of liquid in the syringe meets the specification set out in the MBR (or other protocol). In case the volume measurement shows an out-of-specification value, the feedback can prompt the operator to add or remove a stated amount of liquid as required to meet the specification. An underfilled or overfilled syringe can thus be incrementally charged or discharged respectively before a synthesis or other protocol is performed to ensure that the volume of liquid is within specification. Operator feedback could take place visually and/or audibly. Visual feedback may be delivered by an augmented reality (AR) headset worn by the operator or on a display arranged on the benchtop or on the measurement device. Here it is noted that AR headsets are known tools for supporting operators in performing laboratory procedures. Audible feedback may be delivered by appropriate loudspeakers, e.g. earpieces or headphones worn by the operators or speakers that are mounted in or on the measurement device, fume cupboards, computer workstations etc.

The method may further comprise: outputting the determined volume of liquid.

In some embodiments, wherein the syringe model is determined with reference to the dataset from the length dimension and the syringe manufacturer is determined from the syringe model. In other embodiments, wherein the syringe manufacturer is provided by a data input and the syringe model is determined with reference to the dataset from the input syringe manufacturer and the length dimension.

The method may further comprise: outputting the syringe model and syringe manufacturer.

In some embodiments, the image acquisition device comprises a camera having a field of view and wherein said presenting the syringe to an image acquisition device and said capturing an image of the syringe with the image acquisition device comprise holding the syringe in a syringe holder within the field of view of the camera. Said holding the syringe in a syringe holder within the field of view of the camera may comprise holding the syringe in front of a back board so that the image that is captured by the camera is of the syringe with the back board as a contrast-providing background.

Suitable length dimensions that can be used to identify the syringe model are plunger flange diameter, barrel flange diameter and barrel outside diameter.

In some embodiments, the calibration value(s) for a particular syringe model represents a volume of liquid contained in the syringe at a specific plunger position. One of the calibration values may correspond to the plunger position being withdrawn to where the syringe is filled to its nominally specified syringe volume. Alternatively a partially filled volume can be used which is at least half its nominally specified syringe volume. Another calibration value may correspond to the plunger position being fully depressed in the barrel, where this is likely to be zero or close to zero, since no liquid or only a small amount of liquid will be held in the syringe when the plunger is fully depressed.

To acquire the image, the syringe may be presented to the image acquisition device by holding the syringe in a measurement device configured to hold a syringe in a position that depends on the syringe's outside diameter. The length dimension is then in this case the syringe barrel's outside diameter. The measurement device may comprise a slot of tapering width formed by an opposing pair of rails into which the syringe barrel is slidable until it stops at a stop position part way along the slot as a result of the syringe barrel outside surface coming into tangential contact with each of the rails at one point on their inner surfaces.

According to another aspect of the invention there is provided a computer automated method for outputting the volume of liquid contained in a syringe comprising a barrel with a barrel flange and a barrel bottom surface, and a plunger with a plunger flange, the method comprising:
  providing a dataset storing, for each of a number of syringe models, syringe manufacturer, nominally specified syringe volume, at least one length dimension and at least one calibration value to permit the volume of liquid contained in each syringe model to be computed as a function of plunger position in the barrel;
  inputting an image of the syringe captured with an image acquisition device;
  processing the image to determine a length dimension of the syringe and to identify the plunger position, wherein the plunger position is determined by computer processing the image to identify the plunger flange and either the barrel flange or the barrel bottom surface and then determining the distance therebetween;

referring to the dataset to identify the syringe model based on the length dimension; and referring to the dataset to obtain the calibration values for the identified syringe model and then to determine the volume of liquid contained in the syringe from the plunger position and interpolation between the calibration values.

There may also be provided a computer program stored on a computer readable medium and loadable into the internal memory of a computing device, the computer program comprising software code portions which, when executed, perform the above-specified computer automated method. There may also be provided a computer program product storing the computer program.

According to a further aspect of the invention there is provided test apparatus for measuring the volume of liquid contained in a syringe comprising a barrel with a barrel flange and a barrel bottom surface, and a plunger with a plunger flange, the test apparatus comprising:

a memory storing a dataset containing, for each of a number of syringe models, syringe manufacturer, nominally specified syringe volume, at least one length dimension and at least one calibration value to permit the volume of liquid contained in each syringe model to be computed as a function of plunger position in the barrel;

an image acquisition device operable to capture an image of the syringe; and a processor operable to:

input an image of the syringe captured with an image acquisition device;

process the image to determine a length dimension of the syringe and to identify the plunger position, wherein the plunger position is determined by computer processing the image to identify the plunger flange and either the barrel flange or the barrel bottom surface and then determining the distance therebetween;

refer to the dataset to identify the syringe model based on the length dimension;

refer to the dataset to obtain the calibration values for the identified syringe model; and determine the volume of liquid contained in the syringe from the plunger position and interpolation between the calibration values; and output the determined volume of liquid.

In some embodiments of the test apparatus, the syringe holder further functions as part of a measurement device for determining the syringe barrel's outside diameter, the syringe holder being configured to hold a syringe in a position such that the syringe's position in the image captured by the image acquisition device depends on the syringe's outside diameter, wherein measurement data for determining the syringe barrel's outside diameter is contained in the image and the processor is operable to determine the syringe barrel's outside diameter by further processing the captured image.

In some embodiments of the test apparatus, the outside diameter measurement device comprises a slot of tapering width formed by an opposing pair of rails into which a syringe is slidable until it stops at a stop position part way along the slot as a result of the syringe barrel outside surface coming into tangential contact with each of the rails at one point on their inner surfaces.

The invention may also be implemented without using AR headsets, either directly to acquire the images, or for operator support. For example, the test apparatus may be integrated in a fume cupboard or fume hood or other hardware environment. Moreover, projection mapping may be used for operator support.

BRIEF DESCRIPTION OF THE DRAWINGS

This invention will now be further described, by way of example only, with reference to the accompanying drawings.

FIGS. 13A and 13B are simplified schematic representations of a master batch record and a corresponding batch record.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
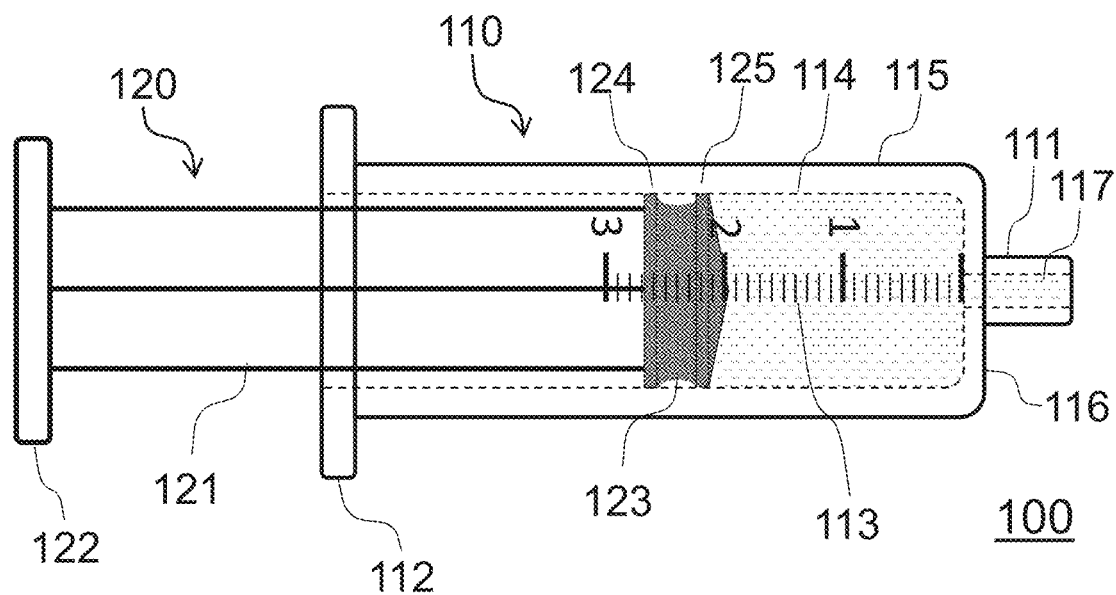
FIG. 1 is a schematic side view of an example generic syringe.
Figure 3A:
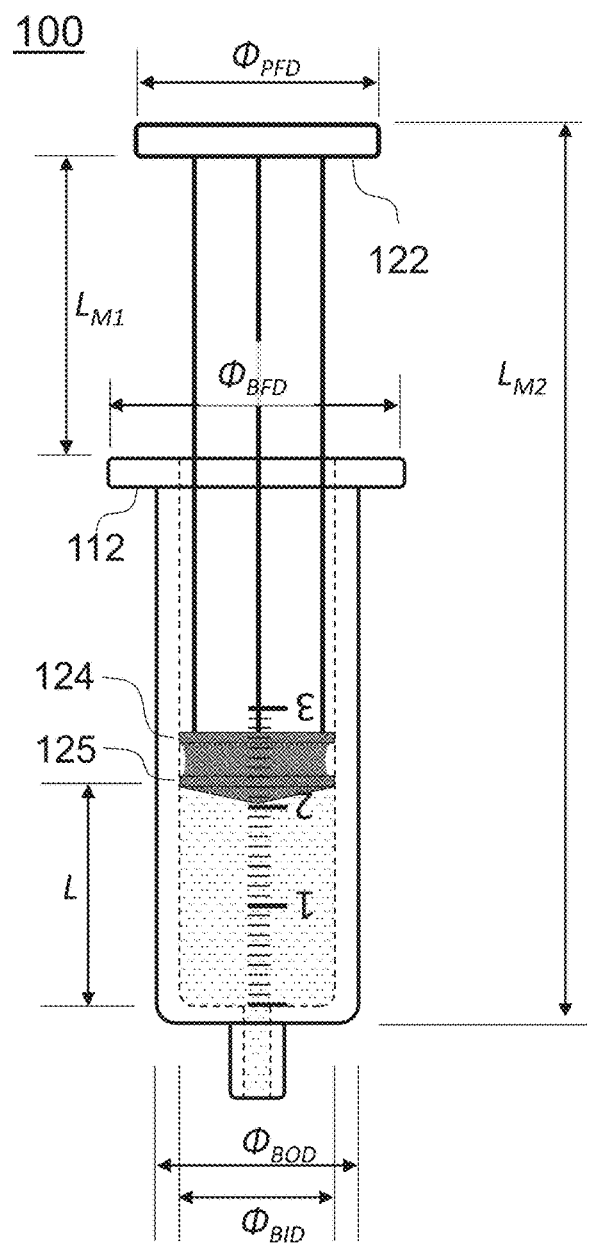
FIGS. 3A and 3B are schematic side views of the example syringe shown in FIG. 1 in a charged, i.e. filled, and discharged, i.e. empty, state.
Figure 3B:
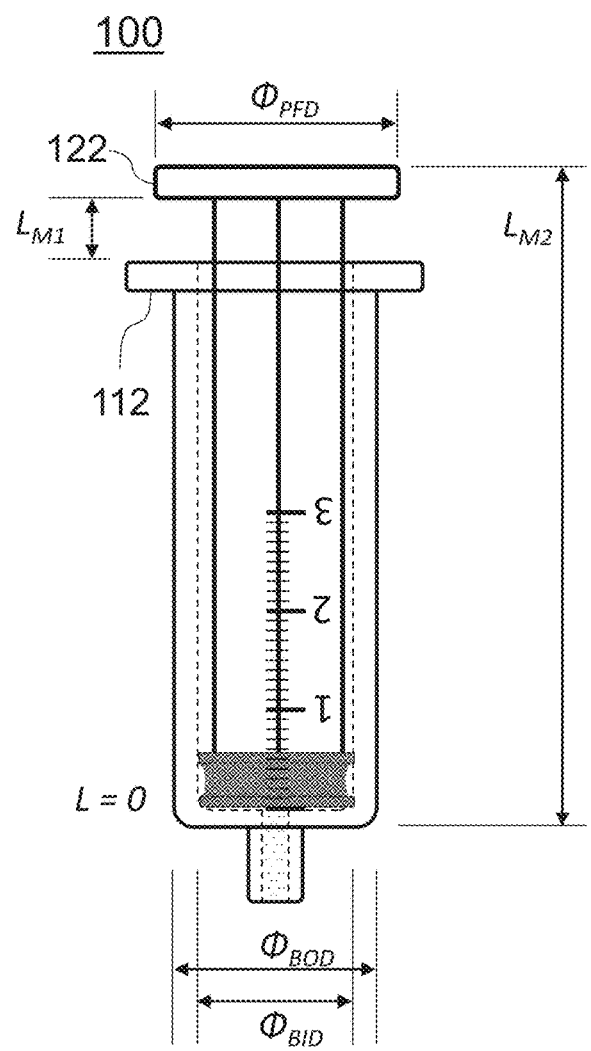

FIGS. 3A and 3B are schematic side views of the example syringe shown in FIG. 1 at two different plunger positions, namely with the syringe in a partially charged, i.e. filled, state and a discharged, i.e. empty, state. The views include labels of various length dimensions relevant for measuring the fill state through plunger position according to embodiments of the invention. To avoid overly cluttering the drawings, not all the reference numerals shown in FIG. 1 are included. The fill height is labelled as dimension L this being zero when the syringe is fully discharged as shown in FIG. 3B. Any vertical distance Ly between a plunger feature and a barrel feature will equal the fill height plus or minus a constant. Two example vertical distances are illustrated. The example distance $L_{M1}$ is the distance between the plunger flange and barrel flange. It is illustrated as being between the bottom surface of the plunger flange and the top surface of the barrel flange, although the other surfaces could be used instead. The example distance $L_{M2}$ is the distance between the plunger flange (the upper surface is illustrated but the lower surface could be used instead) and the bottom (external) surface of the syringe barrel. The barrel and plunger features used for determining the fill height are chosen to be easily identifiable through image processing of an image of the syringe. In this respect, image contrast between the syringe features and the background is an important factor. In principle, the fill height could be directly measured from imaging the liquid column. However, this is difficult, since the liquid may be transparent and therefore have low contrast in the image and it is also possible that the barrel is partially opaque, e.g. made of a coloured plastics material. The barrel and plunger features which are universally identifiable and have high contrast are the barrel flange and the plunger flange. It will be understood that to calculate a fill volume of liquid in the syringe from the fill height additional information is required, since the area of the liquid column (the latter being cylindrical) is also a relevant parameter.

One option for calculating the volume of liquid held in the syringe from the plunger position is to use calibration values for the volume of liquid held in each particular syringe model at different fill states. At least one of the plunger positions taken for calibration needs to be with the syringe full or part full. A convenient choice is to take a calibration value with the plunger position at or near the syringe model's nominally specified syringe volume, e.g. at the 10 mL mark for a 10 ml syringe. In principal however a less full state could be used to obtain such a calibration value.

For each syringe model, it is sufficient to have only one calibration value for the volume of liquid at a particular plunger position, since it may be inferred that the volume of liquid contained in the syringe is zero when the plunger is fully depressed. Alternatively, a calibration value of zero may be stored for the fully depressed plunger position. Conceivably there may also be some syringe models that have a non-zero volume of liquid when the plunger is fully depressed, in which case at least two calibration values would be required to be stored.

With two calibration values (or one calibration value and a second inferred calibration value of zero), the fill volume is determined by linear interpolation between the two. With more than two calibration values, there are more options for interpolation. Linear interpolation could be used based around a best fit to the calibration values. Another option would be to use a curved spline fit and interpolate along the non-linear spline fit.

Another option for calculating the volume of liquid held in the syringe from the plunger position is to convert plunger position into fill height and then multiplying fill height by the area of the liquid column, which can be determined from the inner diameter of the barrel's inner cylindrical surface, labelled $\Phi_{BID}$. The barrel's outer diameter is also labelled, carrying the label $\Phi_{BOD}$.

The image that is captured and used as a basis for applying image processing to identify the barrel and plunger features may be captured by a camera located at a fixed position in relation to the syringe, i.e. in a station where both the syringe and the camera are held statically and in a fixed position in relation to each other. Alternatively, the camera may be unfixed, i.e. in a floating position, as would for example be the case if the camera is a forward-facing camera of an AR headset worn by an operator.

Figure 4:
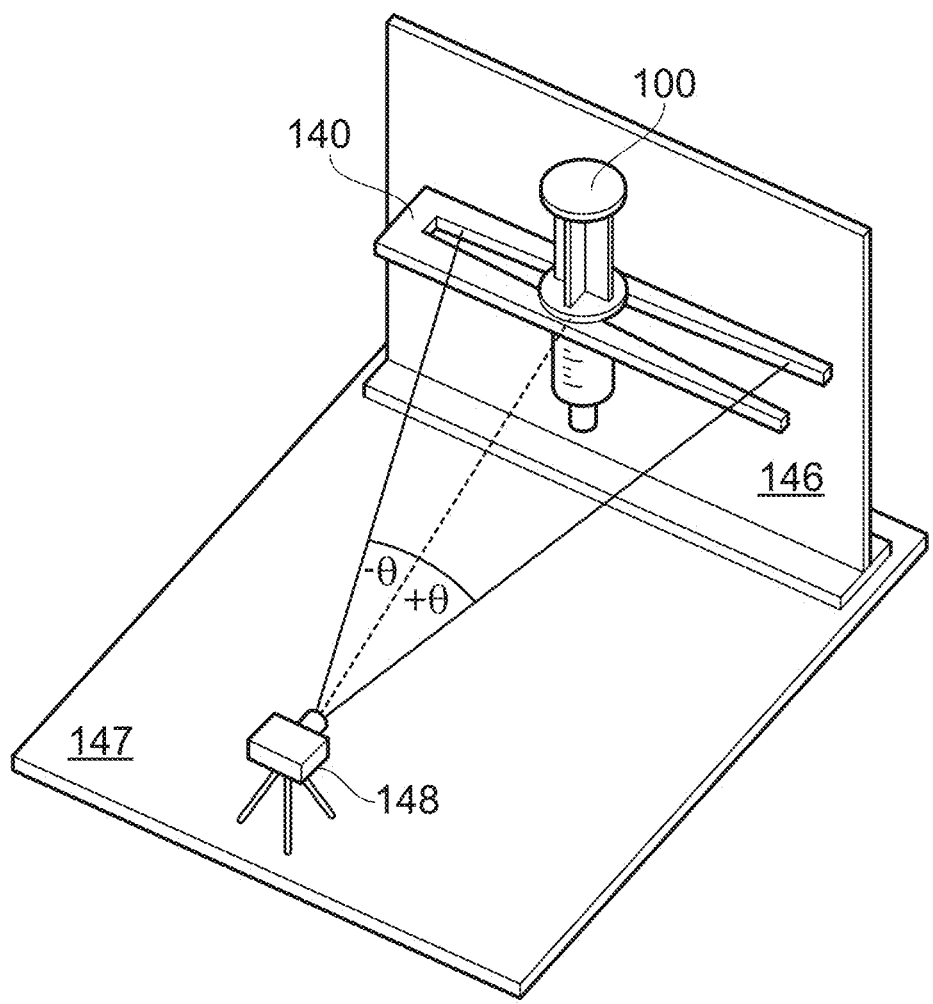
FIG. 4 is a schematic perspective view of a slot-based syringe measurement device.

FIG. 4 is a schematic perspective view of a slot-based syringe measurement device based on using a camera 148 to capture an image of a syringe 100 held engaged in a tapered slot 140. The tapered slot 140 is mounted fixed to a back board 146, e.g. in a cantilever arrangement as illustrated. The back board 146 is mounted fixed on a base board 147. The camera 148 is mounted fixed on the base board 146. The camera 148 is in a fixed position and has a fixed distance from the back board 146 (and tapered slot 140). The fixed camera 148 faces the tapered slot 140 such that it has sufficient field of view to capture an image of the whole slot length. The back board 146 not only has the mechanical function of providing a mount for the tapered slot 140 but can also usefully provide an optical function by forming a high contrast background to a syringe 100 that is in the tapered slot 140. For example, the surface of the back board 146 facing the camera 148 may be a dark colour, e.g. black, and made of a non-reflective material, e.g. matt black. The stop position of a syringe 100 is then deducible from an image captured by the fixed camera 148 through measurement of an angle θ subtended in the plane of the tapered slot 140 between the camera 148 and the syringe 100. The image captured by the camera 148 can thus be used both to determine the syringe outside diameter (through measuring the angle θ which in turn allows the stop position to be determined) and the syringe plunger position.

Figure 5:
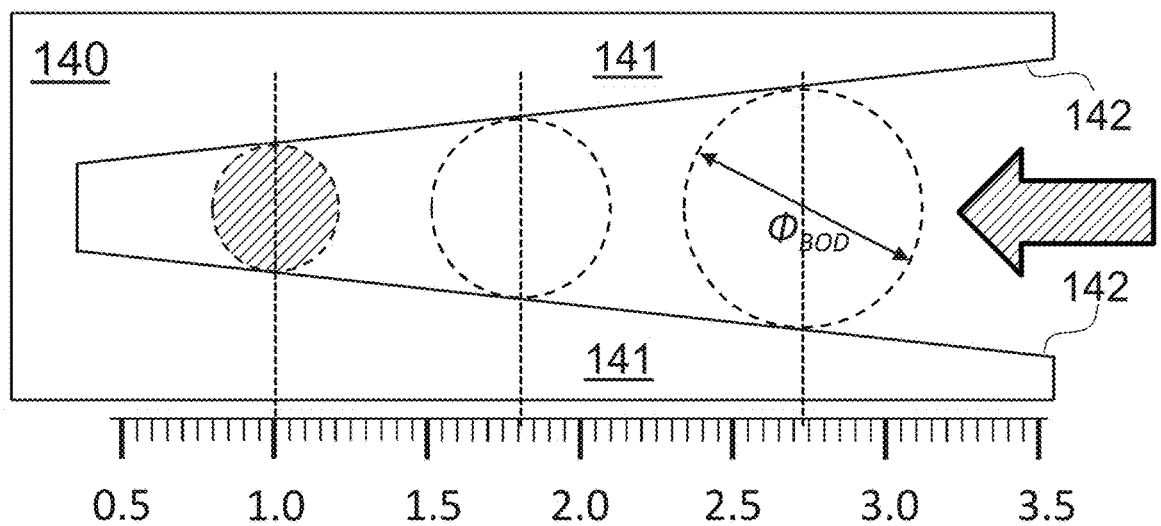
FIG. 5 is a schematic plan view of a syringe outside diameter measurement device based on a slot of tapering width according to an embodiment of the invention.
Figure 6:
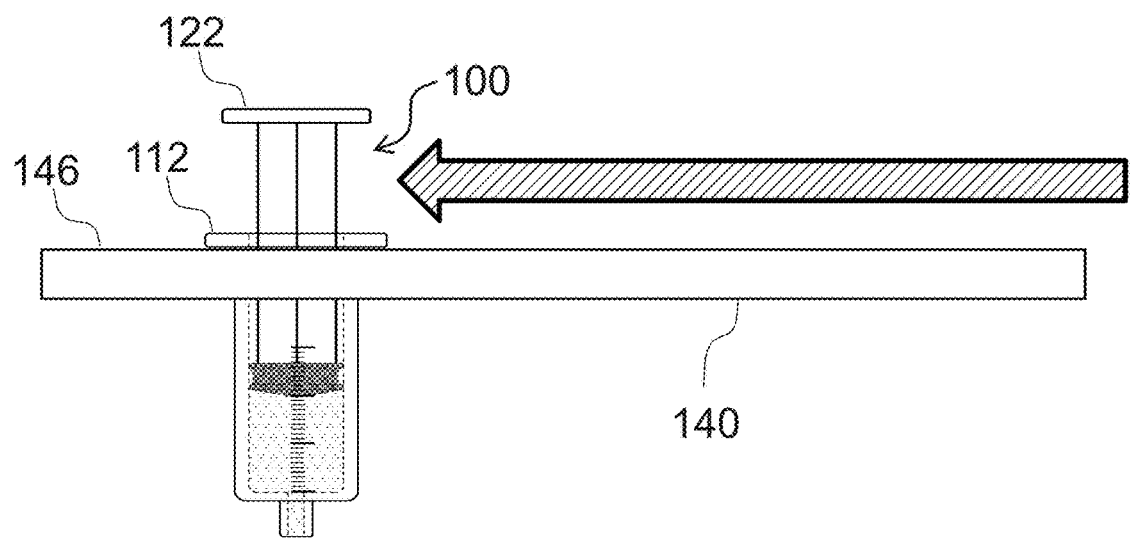
FIG. 6 is a schematic side view of the syringe outside diameter measurement device of FIG. 3 holding a syringe for outside diameter measurement.

FIGS. 5 and 6 are schematic plan and side views of a syringe outside diameter measurement device based on a slot 140 of tapering width according to an embodiment of the invention. The tapered slot 140 is formed by the inner surfaces 142 of an opposing pair of rails 141. A syringe 100 is slidable into the slot 140 by hand until it is stopped at the position at which the outer cylindrical surface 115 of its barrel 110 abuts against the inner slot surfaces 142, i.e. at the point at which the outer diameter of the syringe barrel 110 makes tangential contact with the slot at two points on its circumference. It will be appreciated the from geometric considerations the slot width at the stop position will be somewhat smaller than syringe barrel outside diameter with the magnitude of this is difference depending on how gradual the taper is. FIG. 5 shows schematically the barrel 110 of a syringe 100 of outside diameter of approximately $\Phi_{OD}$=1.0 cm (shaded) as well as other two other syringes with barrel outside diameters of approximately $\Phi_{OD}$=1.8 cm and $\Phi_{OD}$=2.2 cm. As shown in FIG. 6, the stop position can be conveniently arrived at by sliding the syringe 100 along the slot 140 with the syringe barrel flange 112 resting on the slot's upper surface 146. The syringe 100 is thus supported stably at its stop position. The syringe barrel's outside diameter Pop is thus a function of its stop position along the slot 140. As mentioned in the introduction, each syringe manufacturer offers a given syringe model in different sizes, e.g. a set containing syringes of volume 1, 3, 5, 10, 20 and 30 mL. For a given set of syringes from the same manufacturer, as the syringe volume increases, the barrel diameter increases. Moreover, there is no strict standardisation of the syringe dimensions between different manufacturers so that a syringe of a given volume, e.g. 3 mL, from one manufacturer will in general have a different outside diameter than the same volume syringe from another manufacturer. This follows from the fact that the barrel wall thickness (i.e. half the difference between the barrel's inside and outside diameters) may be different and barrel length may be different for the same volume syringes from any two manufacturers. Stop position is therefore a function of syringe barrel outside diameter.

A first option for determining a length dimension of the syringe that is characteristic of the syringe model is to use the dependency on stop position with the syringe barrel's outside diameter $\Phi_{BOD}$ as the way to determine syringe model. The stop position of a syringe 100 is then deducible from an image captured by the fixed camera 148 through measurement of an angle θ subtended in the plane of the tapered slot 140 between the camera 148 and the syringe 100. The image captured by the camera 148 can thus be used both to determine the syringe outside diameter (through measuring the angle θ which in turn allows the stop position to be determined) and the syringe plunger position.

A second option for determining a length dimension of the syringe that is characteristic of the syringe model is to use the slot 140 merely as a universal syringe holder, since the taper allows a syringe of a whole range of barrel outside diameters to be held upright within the field of view of the camera 148. The length dimension used to identify the syringe model is then obtained by image processing the image of the syringe alone (i.e. not with reference to position along the slot 140). As well as barrel outside diameter, other suitable length dimensions that are both characteristic of syringe model and can be reliably extracted from the image captured by the camera 148 include plunger flange diameter PPFD and barrel flange diameter ¢BFD. If desired multiple different length dimensions could be extracted from the image by image processing and then compared against respective stored values in the dataset in order to determine syringe model, which may improve the reliability of the syringe model determination.

A third option for determining a length dimension of the syringe that is characteristic of the syringe model is to combine the first and second options by extracting one or more length dimensions from the image of the syringe (alone) and also by extracting a length dimension of the outside diameter from syringe's angular position in the image, as defined by angle θ.

Figure 7:
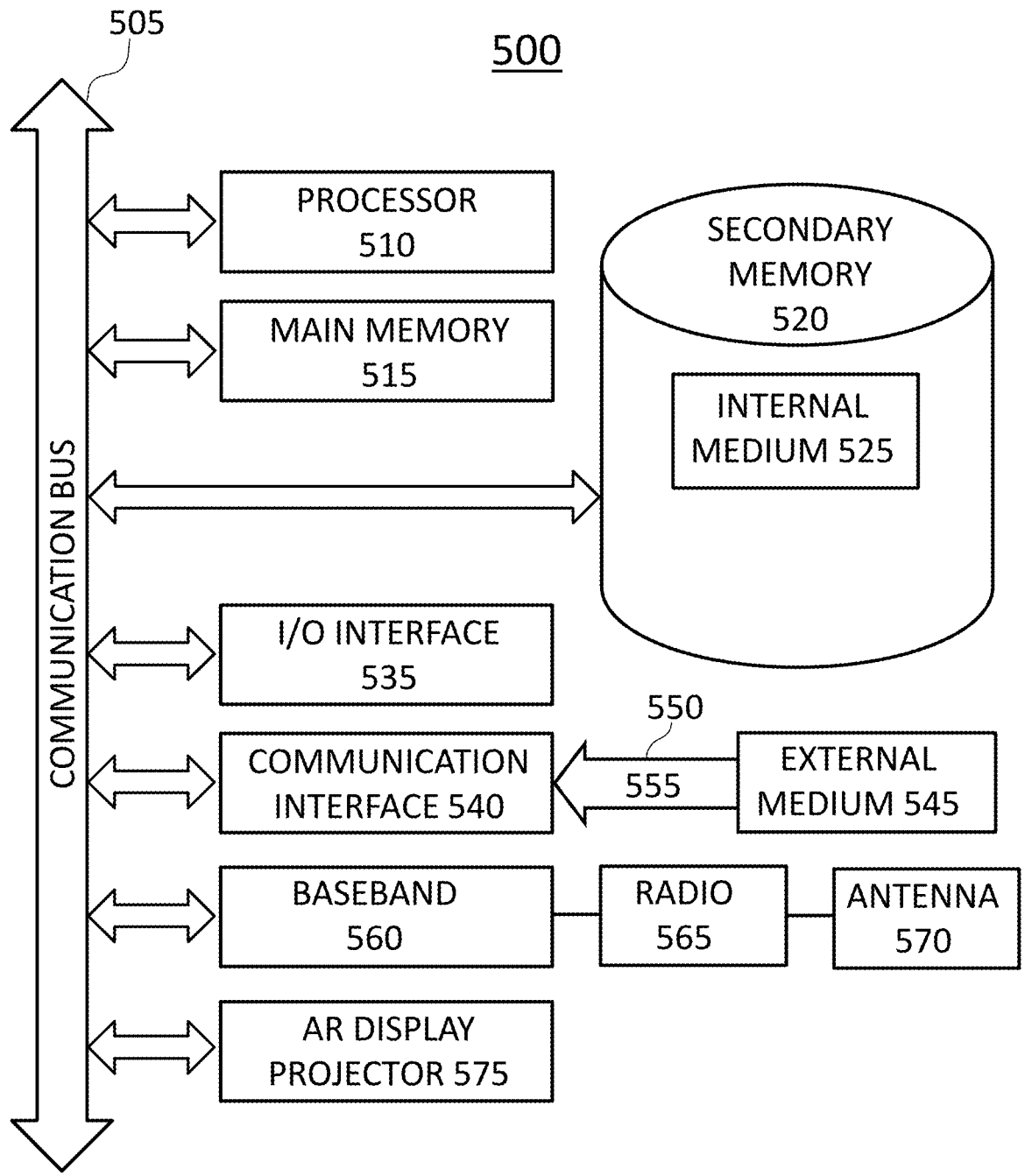
FIG. 7 is a block schematic diagram of a computing apparatus as suitable for carrying out the processing tasks needed for determining the fill state of a syringe.

FIG. 7 is a block schematic diagram of a computing apparatus 500 as suitable for carrying out the processing tasks needed for determining the fill state of a syringe according to embodiments of the invention. The computing apparatus 500 can be any processor-enabled device that is capable of wired or wireless data communication. Other computing apparatus, systems and/or architectures may be also used. Computing apparatus 500 preferably includes one or more processors, such as processor 510. The processor 510 may be for example a central processing unit (CPU), graphics processing unit (GPU), tensor processing unit (TPU) or arrays or combinations thereof such as CPU and TPU combinations or CPU and GPU combinations. Additional processors may be provided, such as an auxiliary processor to manage input/output, an auxiliary processor to perform floating point mathematical operations (e.g. a TPU), a special-purpose microprocessor having an architecture suitable for fast execution of signal processing algorithms (e.g., digital signal processor, image processor), a slave processor subordinate to the main processing system (e.g., back-end processor), an additional microprocessor or controller for dual or multiple processor systems, or a coprocessor. Such auxiliary processors may be discrete processors or may be integrated with the processor 510. The processor 510 is connected to a communication bus 505. Communication bus 505 may include a data channel for facilitating information transfer between storage and other peripheral components of computing apparatus 500. Communication bus 505 further may provide a set of signals used for communication with processor 510, including a data bus, address bus, and control bus (not shown). The computing apparatus 500 preferably includes a main memory 515 and may also include a secondary memory 520. Main memory 515 provides storage of instructions and data for programs executing on processor 510, such as one or more of the functions and/or modules discussed above. Main memory 515 is typically semiconductor-based memory such as dynamic random access memory (DRAM) and/or static random access memory (SRAM). The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Secondary memory 520 may optionally include an internal memory 525. The secondary memory 520 may include other similar elements for allowing computer programs or other data or instructions to be loaded into computing apparatus 500. Such means may include, for example, an external storage medium 545 and a communication interface 540, which allows software and data to be transferred from external storage medium 545 to computing apparatus 500.

As mentioned above, computing apparatus 500 may include a communication interface 540. Communication interface 540 allows software and data to be transferred between computing apparatus 500 and external devices which may be networked together. For example, computer software or executable code may be transferred to computing apparatus 500 from a network server via communication interface 540. The communication interface 540 preferably implements industry-promulgated protocol standards, such as Ethernet IEEE 802 standards, fibre channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customised or non-standard interface protocols as well. Software and data transferred via communication interface 540 are generally in the form of electrical communication signals 555. These signals 555 may be provided to communication interface 540 via a communication channel 550. In an embodiment, communication channel 550 may be a wired or wireless network, or any variety of other communication links. Communication channel 550 carries signals 555 and can be implemented using a variety of wired or wireless communication means including wire or cable, fibre optics, conventional phone line, cellular phone link, wireless data communication link, radio frequency (RF) link, or infrared link, just to name a few. Computer-executable code (i.e., computer programs or software) is stored in main memory 515 and/or the secondary memory 520. Computer programs can also be received via communication interface 540 and stored in main memory 515 and/or secondary memory 520. Such computer programs, when executed, enable computing apparatus 500 to perform the various functions of the disclosed embodiments as described elsewhere herein.

In this document, the term "computer-readable medium" is used to refer to any non-transitory computer-readable storage media used to provide computer-executable code (e.g., software and computer programs) to computing apparatus 500. Examples of such media include main memory 515, secondary memory 520 (including internal memory 525 and external storage medium 545), and any peripheral device communicatively coupled with communication interface 540 (including a network information server or other network device). These non-transitory computer-readable media are means for providing executable code, programming instructions, and software to computing apparatus 500. In an embodiment that is implemented using software, the software may be stored on a computer-readable medium and loaded into computing apparatus 500 by way of input/output (I/O) interface 535, or communication interface 540. In such an embodiment, the software is loaded into computing apparatus 500 in the form of electrical communication signals 555. The software, when executed by processor 510, preferably causes processor 510 to perform the features and functions described elsewhere herein.

The I/O interface 535 provides an interface between one or more components of computing apparatus 500 and one or more input and/or output devices. Example input devices include the forward-facing camera(s) 30, the eye-directed camera(s) 32, audio in/out, accelerometer, gyroscope, sensors etc. and any other inputs associated specifically with the AR headset as well any other sensors or standard UI devices such as keyboards, touch screens or other touch-sensitive devices, biometric sensing devices, computer mice, trackballs, pen-based pointing devices, and the like.

The computing apparatus 500 also includes optional wireless communication components that facilitate wireless communication over a voice network and/or a data network. The wireless communication components comprise an antenna system 570, a transceiver radio system 565, and a baseband system 560. In computing apparatus 500, RF signals are transmitted and received over the air by antenna system 570 under the management of the transceiver radio system 565. The antenna system 570 may comprise one or more antennae and one or more multiplexors (not shown) that perform a switching function to provide antenna system 570 with transmit and receive signal paths. In the receive path, received RF signals can be coupled from a multiplexor to a low noise amplifier (not shown) that amplifies the received RF signal and sends the amplified signal to the transceiver radio system 565. The transceiver radio system 565 may comprise one or more transceivers that are configured to communicate over various frequencies. The radio system 565 combines a demodulator (not shown) and modulator (not shown) for receiving and transmitting respectively, which may be implemented in one integrated circuit (IC) or separate ICs. In the incoming path, the demodulator strips away the RF carrier signal leaving a baseband receive audio signal, which is sent from radio system 565 to baseband system 560. The baseband system 560 is also communicatively coupled with processor 510, which may be a CPU. Processor 510 has access to data storage areas 515 and 520. Processor 510 is preferably configured to execute instructions (i.e., computer programs or software) that can be stored in main memory 515 or secondary memory 520. Computer programs can also be received from baseband processor 560 and stored in main memory 510 or in secondary memory 520 or executed upon receipt. Such computer programs, when executed, enable computing apparatus 500 to perform the various functions of the disclosed embodiments. For example, data storage areas 515 or 520 may include various software modules.

The computing apparatus is shown integrated with an AR display projector 575 integrated with the light sources 20 and directly attached to the communication bus 505.

The data processed locally, i.e. in the AR headset or with an ancillary computer apparatus local to the wearer, may include data captured from devices and sensors integrated with the AR headset for onward transmission to the network or internal local processing by the AR headset and data received by the AR headset from the network for communication to the wearer. The data may be acquired and/or processed remotely at a computing node located at an arbitrary location in the network. The local computer apparatus may be operatively coupled to any remote computing nodes or data storage by communication links, such as via wired or wireless communication links. The wearer-facing camera(s) can be used to capture eye images for eye image segmentation or eye tracking.

A remote computing node may be configured to analyse and process data and/or image information such as stills images and video images captured by the AR headset's camera(s). Captured image data may be stored locally for a limited amount of time, e.g. until safely transmitted onward or for the duration of a shift or user session. In some embodiments, there may be a remote digital data storage device, which may be available through the internet or other networking configuration in a "cloud" resource configuration.

Various embodiments may also be implemented primarily in hardware using, for example, components such as application specific integrated circuits (ASICs), programmable logic arrays (PLA), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, read-only memory (ROM) memory, erasable programmable ROM (EPROM) memory, electrically erasable PROM (EEPROM) memory, registers, hard disk, a removable disk or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

A computer readable storage medium, as referred to herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

For carrying out embodiments of the invention, i.e. a computer automated method for outputting the volume of liquid contained in a syringe, the main memory 515 and/or the secondary memory 520 are loaded with a dataset storing, for each of a number of syringe models, syringe manufacturer, specified syringe volume and one or more length dimensions (e.g. flange diameter of the barrel or plunger, barrel outside diameter) as well as one or more calibration values that permit the volume of liquid contained in each syringe model to be computed as a function of distance between a feature of the plunger and a feature of the barrel (e.g. stopper position in the barrel). The dataset may have the form of a look-up table or database for example.

The computing apparatus 500 receives the following inputs. An image of the syringe is input into the computing apparatus 500. Optionally, the computing apparatus 500 also receives an input specifying the identity of the syringe manufacturer. For inputting the syringe manufacturer, the operator may be prompted via a UI, such as a GUI, which may be incorporated in an AR headset or on a computer screen as integrated in a tablet or desktop computer. The operator may be given the option of entering a "don't know/not sure" response. These inputs to the computing apparatus 500 may be via the I/O interface 535 and/or wirelessly via the antenna 570.

A software application is loaded in the secondary memory 520 and executed to perform the computer automated method for determining the volume of liquid contained in a syringe according to the input image and optional additional measurement value of syringe length dimension.

The software application causes the processor 510 to process the input image of the syringe to identify the plunger feature and the barrel feature of the syringe and to compute the distance between the plunger and barrel features. In embodiments for which the input image is also used to determine the syringe length dimension, the software application further causes the processor 510 to process the input image of the syringe to determine the syringe length dimension. In other embodiments, the syringe length dimension is provided as an input.

In embodiments or instances in which the syringe manufacturer has been input to the computing apparatus, the syringe model is determined with reference to a subset of the dataset specific to the syringe manufacturer that has been input and the measured syringe length dimension. Identification may be made conditional on the measured syringe length dimension having a value within a specified tolerance of the stored values for that manufacturer, e.g. plus-minus a certain value in millimetres. In case, no matching syringe model is found for that manufacturer, the software application may prompt the user by asking whether the manufacturer being applied is correct and permitting the user to enter a different manufacturer. The operator may be prompted to discard the syringe and use a different one instead so that the measurement process can be repeated.

In embodiments or instances in which the syringe manufacturer has not been input to the computing apparatus, the syringe model is determined with reference to the dataset from the measured syringe length dimension alone. The syringe manufacturer is then determined from the determined syringe model. This approach assumes that no two manufacturers have syringe models with identical or closely matching syringe length dimensions. The method may be made more robust and allow for better disambiguation between syringes from different manufacturers by including one or more further physical parameters for consideration that can be determined from image processing of an image of the syringe, in particular in side view or perspective view, such as barrel flange diameter or shape (if not circular) and plunger flange diameter or shape (if not circular). The dataset would then include these other physical parameters and the software application would be adapted to process the input syringe image to obtain values for these other physical parameters.

After completion of the above part of the processing, the software application then outputs the syringe model and syringe manufacturer as determined. This may be output to the operator for confirmation, e.g. via an AR headset worn by the operator, and then upon receipt of operator confirmation written into the batch record.

The processor 510 under control of the software application processes the input syringe image to identify the plunger feature and the barrel feature. The image is then further processed to determine the distance between the identified plunger and barrel features. This distance is equal to the fill height of the syringe plus or minus a constant value (which may be zero). The fill height can thus be deduced. Reference to the dataset is then used to determine the volume of liquid contained in the syringe. The dataset contains the barrel inside diameter value for each syringe model. In the simplest case, the volume of liquid contained in the syringe is (or is assumed to be) zero when the syringe plunger is fully depressed. Alternatively, the dataset may include for each syringe model a residual value of the volume that is stored in the syringe when the plunger is fully depressed. Full depression of the syringe plunger 120 may correspond to abutment of the plunger stopper 123 at the bottom inner surface of the syringe barrel 110 or to abutment of the plunger flange 122 on the barrel flange 112, wherein the syringe may be dimensioned such that both abutments occur simultaneously. In this simplest case, the software application computes the volume of liquid contained in the syringe simply as a cylinder volume, i.e. $(\pi d^2 \cdot h)/4$ where d is barrel inside diameter and h is fill height. Optionally the dataset may include a residual volume, this being the volume of liquid contained in the syringe when the plunger is fully depressed, the residual volume being specific to each syringe model. The residual value will need to be added to the volume of the liquid column determined from fill height and liquid column area. The residual volume may for example be the volume of the tip outlet channel 117. Alternatively, the dataset may simply provide a look-up or function to determine fill volume as a function of the measured distance between the plunger and barrel features. In such an approach there would be no need to convert the measured distance between plunger and barrel features into a fill height; rather the measured distance could be used directly for the look-up or as a parameter of the function.

After completion of the above part of the processing, the software application then outputs the determined volume of liquid. As described below, in the context of performing a pharmaceutical manufacturing process according to a master batch record, the determined volume of liquid needs to be checked against a specified volume for the synthesis or other other process. The determined value is then output to the operator with reference to the specified value and an indication of whether the determined value is inside or outside specification. If the specified volume is 2.8±0.1 mL then a determined value of 2.86 mL would be within specification whereas on of 2.92 mL would be outside specification.

Assuming the determined volume is within specification, either immediately or after the operator has discharged or charged a small amount of liquid from the syringe responsive to feedback that the determined volume was too high or low respectively, the determined volume is written into the batch record as an output.

Figure 8:
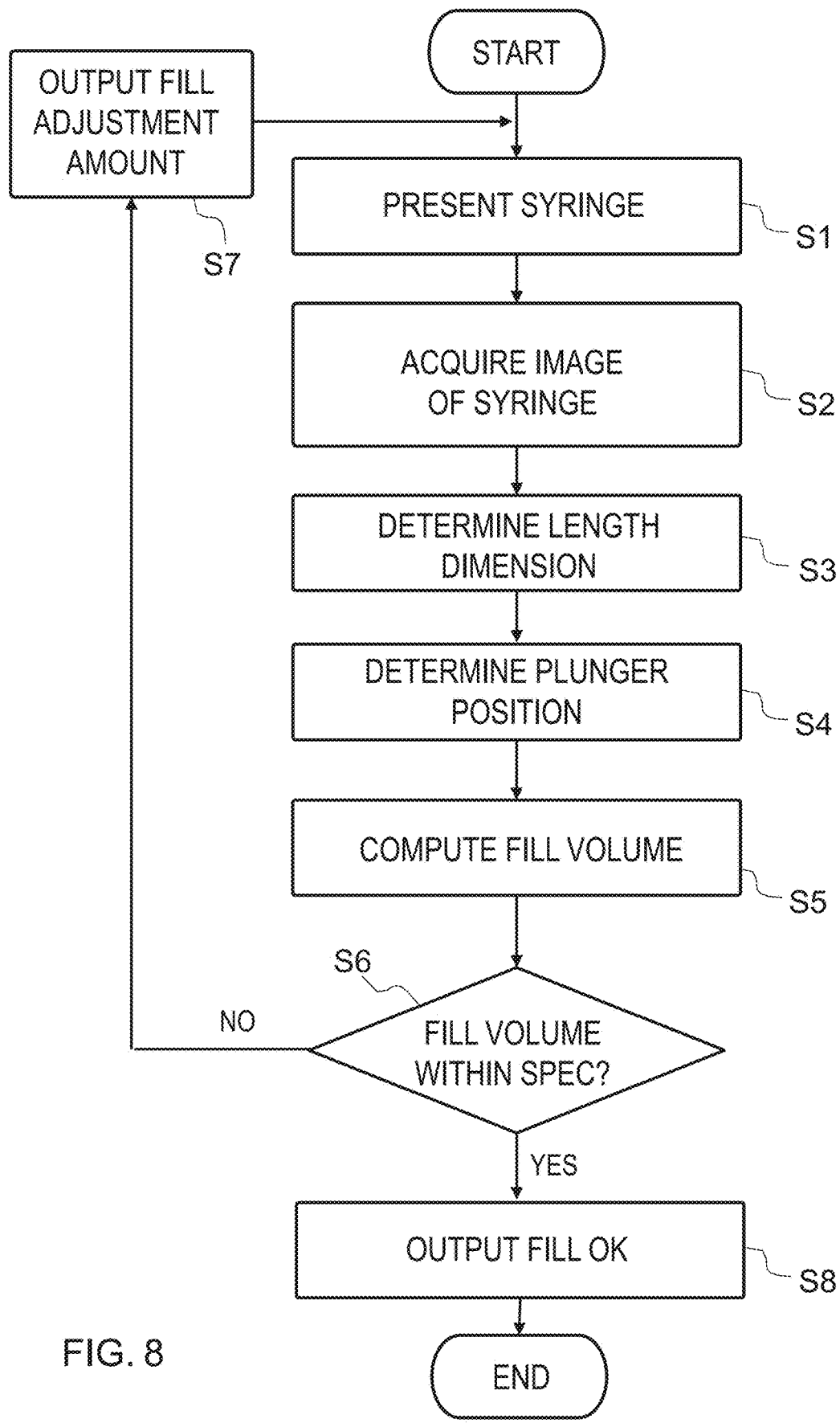
FIG. 8 is a flow diagram of an example process flow for determining the fill volume of a syringe according to embodiments of the invention.

FIG. 8 is a flow diagram of an example process flow for determining the fill volume of a syringe according to embodiments of the invention. As already described above, the method is predicated on there being a dataset available which stores, for each of a number of syringe models, syringe manufacturer, specified syringe volume and syringe length dimension as well as one or more parameters that permit the volume of liquid contained in each syringe model to be computed as a function of distance between a feature of the plunger and a feature of the barrel, e.g. the syringe barrel inner diameter for each syringe model.

In Step S1, the method starts by presenting the syringe to a camera such as by placing the syringe in the above-described tapered-slot-based device.

In Step S2, an image of the syringe is acquired.

In Step S3, the image is processed to obtain one or more length dimensions of the syringe that are characteristic of syringe model which may be done: by analysing the part of the image containing the syringe alone; by analysing the syringe's position in the scene as defined by where it has come to rest through abutment in the tapered slot to measure the barrel outside diameter as the length dimension; or from a combination of the two approaches.

In Step S4, the plunger position relative to the barrel is determined by image processing of an image of the syringe. This is done by identifying the plunger flange and either the barrel flange or the bottom (external) surface of the syringe barrel. The distance between them along the direction of the principal axis of the syringe is then determined from which the fill height can be deduced.

In Step S5, the fill volume is determined by one of the approaches described above, e.g. based on a cylindrical volume computed from the fill height and the inside diameter of the syringe barrel or by interpolation between calibration values for the fill volume at two or more plunger positions.

In Step S6, it is decided whether the fill volume as determined is within specification, e.g. as specified in the master batch record for the synthesis process being performed.

If the fill volume is outside specification, then an adjustment fill volume is output in Step S7, the adjustment fill volume being the difference between the measured fill volume and the ill volume specified for the protocol being performed. This prompts the operator to charge or discharge the syringe by an appropriate amount before repeating the process from Step S1 so that the fill volume can once again be determined and compared against the protocol's specification.

If the fill volume is inside specification, then the fill volume is OK as indicated in Step S8 and the process ends. As part of Step S8, the determined fill volume can be stored to the batch record.

Figure 2:
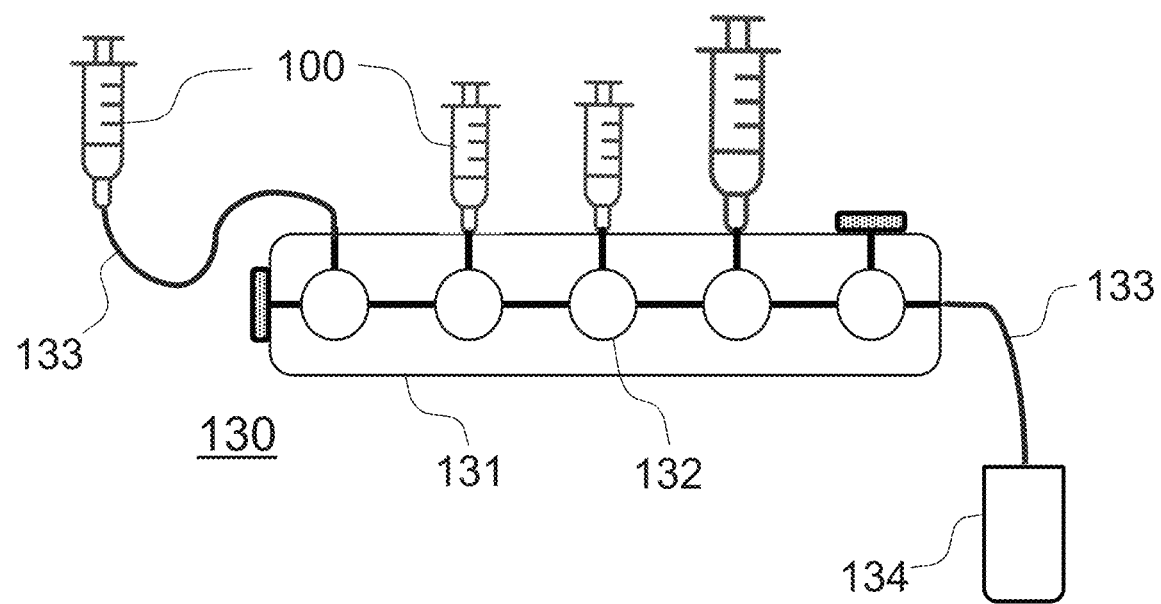
FIG. 2 is a schematic drawing of an example generic synthesis module.

It will be understood that the above method can be used in the context of performing a synthesis such as with a synthesis module 130 as described with reference to FIG. 2 in the introduction in order to verify the fill volumes of multiple syringes used to provide liquid reagents or other liquids for the synthesis.

For documenting protocols including those which involve checking and recording what syringe fill volumes were used in the protocol according to embodiments of the invention, it may be useful for the operator to wear an AR headset which in combination with appropriate software control supports the operator to generate full documentation of the protocol and may also reduce the likelihood of operator error through incorrect filling of syringes.

The AR headset may be in a glasses format (i.e. spectacles) or helmet and visor format, for example. An example AR headset that is commercially available is the Microsoft® Hololens®.

Figure 9:
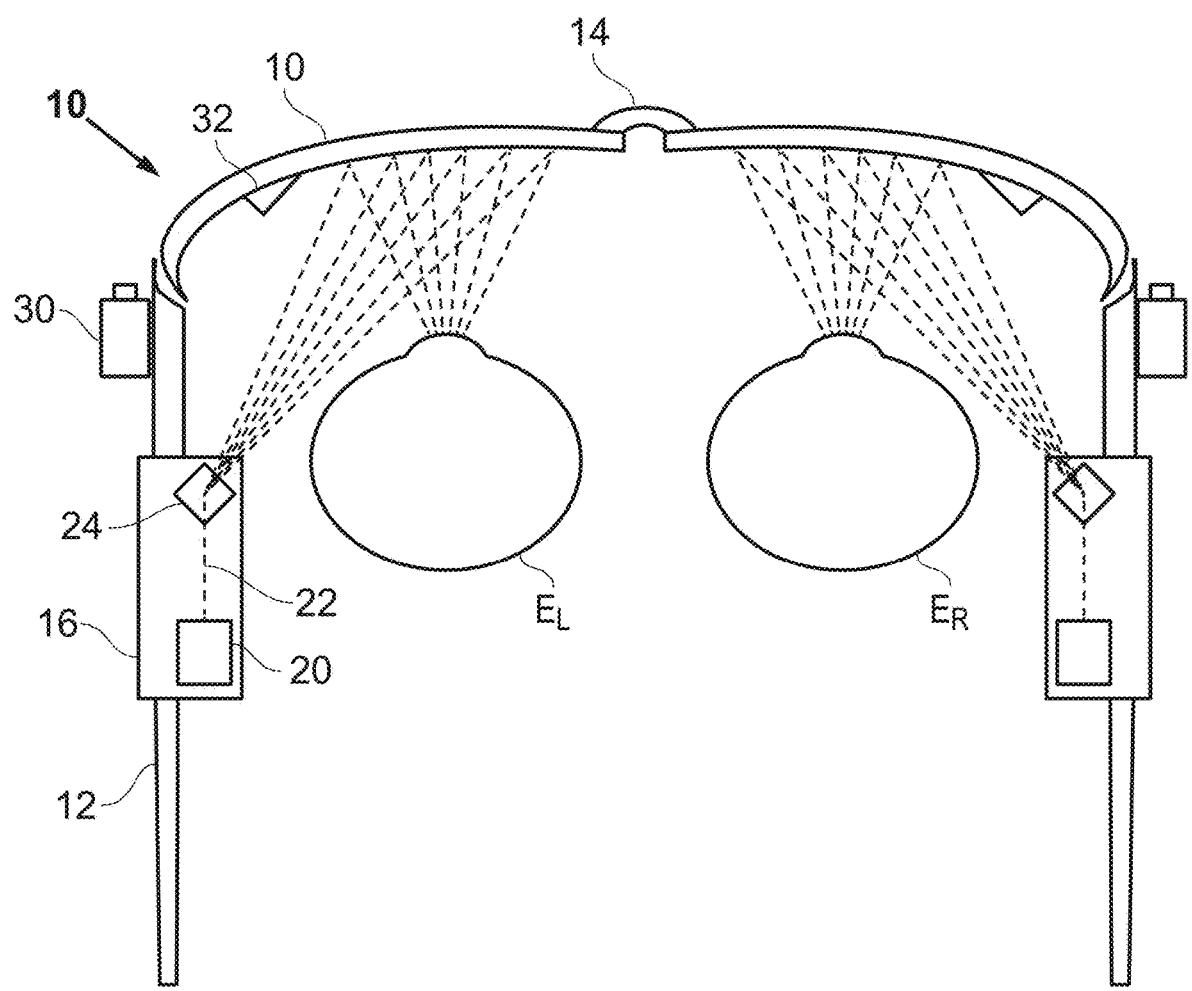
FIG. 9 schematically illustrates augmented reality glasses in a spectacles format.

FIG. 9 illustrates an example of an AR headset 1 in glasses format as it would be for a direct projection system in a spectacles format. The basic features in a spectacles format are a pair of lenses 10, a pair of temples 12 and a bridge 14. The AR headset 1 can be used to present an overlay image to a wearer. An overlay image may be an augmenting overlay image to augment the scene being viewed by the wearer, e.g. an arrow pointing to an object of interest in the scene as identified by image processing of video captured by a forward-facing camera. An overlay image may also be a non-augmenting overlay image that is intended to provide an image for the wearer to view that has no direct graphical link to the scene, e.g. to present a text-containing portion of a document for the wearer to read as a content item. The same image, or paired left- and right-hand image components, are directly projected onto the retinas of the wearer's left eye EL and right eye ER. With direct projection into both eyes it is possible not only to convey to the wearer conventional two-dimensional (2D) images, but also stereoscopic three-dimensional (3D) images. On each of the left and right sides, a housing 16 is integrated midway along a temple 12 and houses a light source unit 20. The light source unit 20 houses respective semiconductor laser diodes (LDs) or other suitable sources for emitting visible light in the red, green and blue (RGB) wavelength ranges respectively, thereby forming an RGB source module. The combined RGB light beam 22 output by the light source unit 20 is directed to a scanning element 24 which projects an image on the inside surface of the lens 10 on its side. In a direct retinal projection system, the inside surface of each lens 10 reflects the scanned beam onto a wearer's eyes EL and ER to directly project onto the wearer's retina. Alternatively, in other embodiments, the headset may use a conventional projection system, in which the wearer will view the image scanned onto the inside surface of the lenses 10. It will be understood that the reference to lenses does not imply that they have any lensing function insofar as the projection system is concerned, rather it merely follows conventional terminology. The lenses in the AR headset 1 have the primary function of enabling the overlay image to be displayed to the wearer by providing a reflection surface for direct retinal projection or a projection surface for conventional projection.

The AR glasses 1 include at least one forward-facing camera 30 operable to capture stills images or video in the field of view of the wearer. The mounting may be on the temple 12 as illustrated or may be integrated in the bridge 14 or rim (i.e. frame) around the lenses 10, for example. One or more wearer-facing cameras 32 may also be provided to capture images of the wearer's eyes, e.g. for eye tracking or eye segmentation. The mounting may be on the inner surface of the lenses 10 as illustrated or on the bridge 14, for example.

Figure 10:
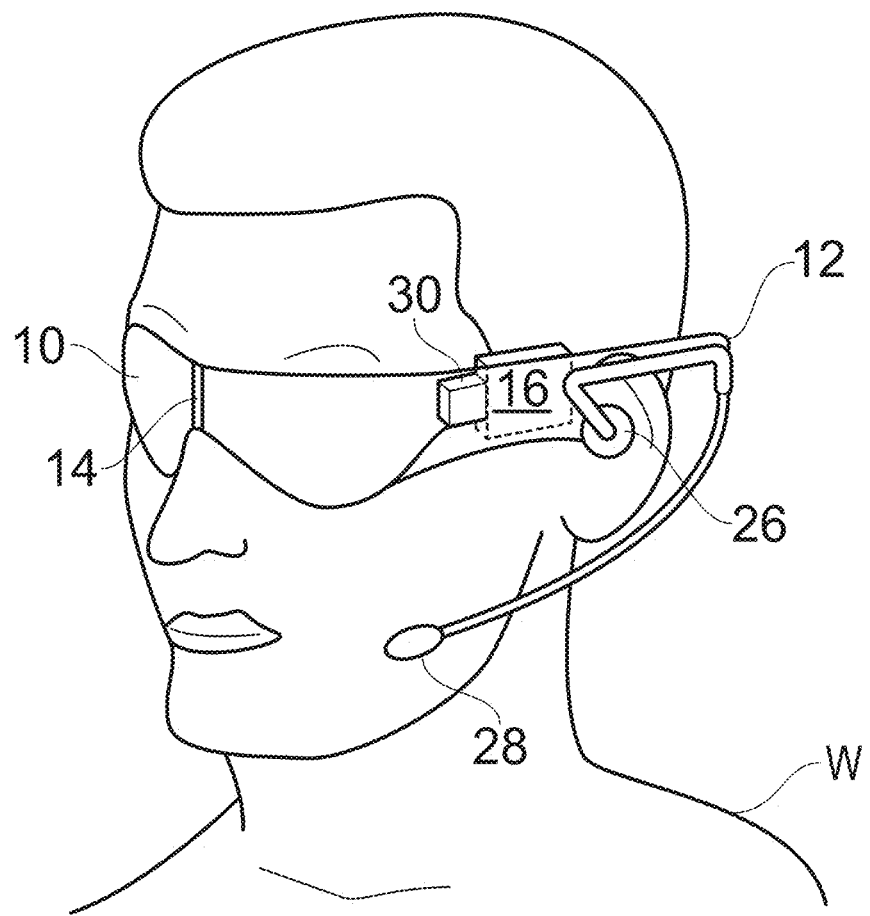
FIG. 10 is a schematic diagram of a person wearing the AR glasses of FIG. 9.

FIG. 10 is a schematic diagram of a wearer W wearing the AR glasses 1 of FIG. 9. In addition to the features visible in FIG. 8, there is shown an earpiece unit having an earpiece 26 arranged adjacent the wearer's ear canal for conveying an audio input to the wearer W as well as a microphone 28 arranged at the distal end of a supporting boom which may conveniently be attached to and formed integral with the earpiece unit.

The AR headset may have the following features:

display (e.g. retinal or on inside surface of glasses)

wireless (or wired) communication transceiver (e.g. via Bluetooth)

forward-facing camera (for capturing gesture input, e.g. thumbs up for 'no', thumbs down for 'yes', diver-OK gesture for 'OK', sign language gestures, also for capturing images. The images may be of instrument or computer displays to collect individual numeric measurement values, graphs or whole or part of display screens as a screen capture). In the context of the present invention, an image of a syringe is of particular relevance.

inward-facing camera (for eye-tracking, e.g. pupil tracking)

microphone (audio in)

speaker (audio out-typically headphone-type)

touch sensor (for user input, e.g. through tapping or drag gestures)

accelerometer (option for capturing gesture input, e.g. head shake for 'no' or nod for 'yes', tracking operator motion through the cleanroom optionally in combination with camera input gyroscope such as an optical fibre gyroscope (option to allow inertial tracking of an operator wearing the AR headset)

sensors for monitoring the wearer or the wearer's environment (e.g. wearer's body temperature, carbon dioxide sensor to monitor wearer's tiredness, pulse sensor, humidity/dryness sensor to monitor air quality, radiation detector to measure wearer's accumulated exposure, sensor for any particular gaseous compound potentially associated with the manufacturing process, e.g. to sense if there is a leak of a hazardous compound)

forward-facing directional temperature sensor, such as a thermal camera, to measure the temperature of objects of interest in the scene directional radiation detector which may be mounted on the AR headset or be provided as an ancillary hand-held component which can be pointed processor memory Some of these items, such as some of the sensors, may be present and in wireless or wired communication with the headset, but not integrated in the AR headset. For example, some sensors may be worn or carried by the operator.

The AR headset and optionally other ancillary devices may be collectively configured to provide a user interface (UI) for the wearer to interact with an application being run on a remote computer with a data communication link to the AR headset. The remote computer may be as described with reference to FIG. 7. A computer as described with reference to FIG. 7 may also be integrated into the AR headset. A headset computer and a remote computer may be in communication, e.g. via a local wireless or wired communication connection. The associated electronic components may also be accommodated in the housing 16 or may be arranged in some local ancillary component worn or carried by the wearer, e.g. a collar yoke, utility belt, helmet, pocket format unit placed, e.g. in a vest. The local computing apparatus 500 can provide limited capabilities for image and other data processing, data storage and so forth, so that the AR headset 1 may act, for example, as: a thin client to reproduce images received via its transceiver, initial processing of a wearer's graphical UI (GUI) actions such as gestures or eye tracking.

The UI may use any combination of graphics on the AR headset, voice commands from the wearer, voice instructions to the wearer, handheld remote control with one or more buttons, e.g. in a button array, such as buttons for: scroll up, scroll down, field population with affirmative (tick), field population with negative (cross) etc.

A user's input to a microphone, which will typically be integrated in the AR headset, may be in the form of natural language voice input which a processor in the AR headset or local thereto, or a processor remotely located, e.g. in the cloud, is operable to convert to text. For example, the user may have spoken to a virtual assistant (e.g. Apple Siri, Google Assistant, Microsoft Cortana-RTMs) running on a user equipment in possession of the wearer of the AR headset. The wearer is thus able to use natural language voice input to issue commands to the user interface. The UI may be provided with various commands linked to AR headset camera operation in order to capture stills or video images. One command may be to capture a stills image from the forward-facing camera of the AR headset and another command may be to capture a video clip from the same camera. In the context of the present invention, commanding the capture of an image of a syringe is of particular relevance.

A video feed from a scene captured with a forward-facing camera of the AR headset may be image processed to perform segmentation and identify one or more objects of interest in the scene. In the context of the present invention, commanding the capture of a video clip of a syringe is of particular relevance including subsequent segmentation. The segmentation can be coordinated with the overlay projected onto the AR headset to augment the scene. Coordination can be aided by input from sensors on the AR headset and optionally also other sensors which indicate where the wearer is looking and how this is changes. The wearer's view direction or line of sight of the wearer can be tracked by one or more of the following sensor inputs: head motion tracking through a gyro and/or accelerometer; eye tracking; sensing the wearer's head position or body position. The wearer's position can be tracked by one or more of: following a tracking device worn by the user; following the user in the cleanroom through triangulated network of observation cameras of the type familiar from closed-circuit television (CCTV), which may for example be ceiling mounted; through inertial guidance with a gyro sensor. The image processing of image data input from an AR headset can be further aided by use of a 3D map of the cleanroom. The cleanroom may be mapped in detail, e.g. by architectural plans; through a triangulated network of observation cameras; through merging video feeds from the forward-facing cameras of AR headsets worn by people in the cleanroom; and by any combination of these. Segmentation may also be applied to a stills image, for example when a stills image forms part of a workflow for documenting completion of a task, e.g. completion of assembly of a unit.

Graphical overlays and other guidance and instructions given to the wearer may be delivered to the AR headset to guide an operator through a pharmaceutical manufacturing process. At the same time, process monitoring and compilation of documentation relating to the pharmaceutical manufacturing process can be supported by a combination of inputs received from the AR headset and from ancillary devices worn by the user. The AR headset cannot be used to guide and instruct, or monitor and document, it can involve the wearer in interactive operation so these actions merge. For example, if a known process is deviated from by the operator, the system can alert the operator via the AR headset, and then the operator is prompted to check his/her work and if needed take remedial action.

A forward-facing directional temperature sensor, such as a thermal camera, may be incorporated in the AR headset or an ancillary device, to capture a thermal map of the scene being viewed by the wearer. The thermal map may then be composited with the conventional scene. In this way, the temperature of objects of interest in the scene can be tracked. For example, if a chemical reaction that forms a step of the pharmaceutical manufacturing process is exothermic, and a particular temperature and/or temperature profile over time is associated with this reaction having been successful in the context of the manufacturing step, then this can be monitored and documented. Similarly, to thermal data, a directional radiation detector may be used to capture radioactivity type and level of radiopharmaceutical product or its precursors, and this may also be integrated into the segmented image of the scene.

Depending on the embodiment, not all of these features may be needed. At its most basic, the AR headset requires a display for visual display of text content from an electronic document in combination with a user interface to allow the operator to make entries into an electronic document and an appropriate communication channel to transfer data to and from the AR headset to a computer system that manages the electronic documents. In embodiments in which the AR headset is used to capture images of a syringe, a forward-facing camera is required.

Figure 11:
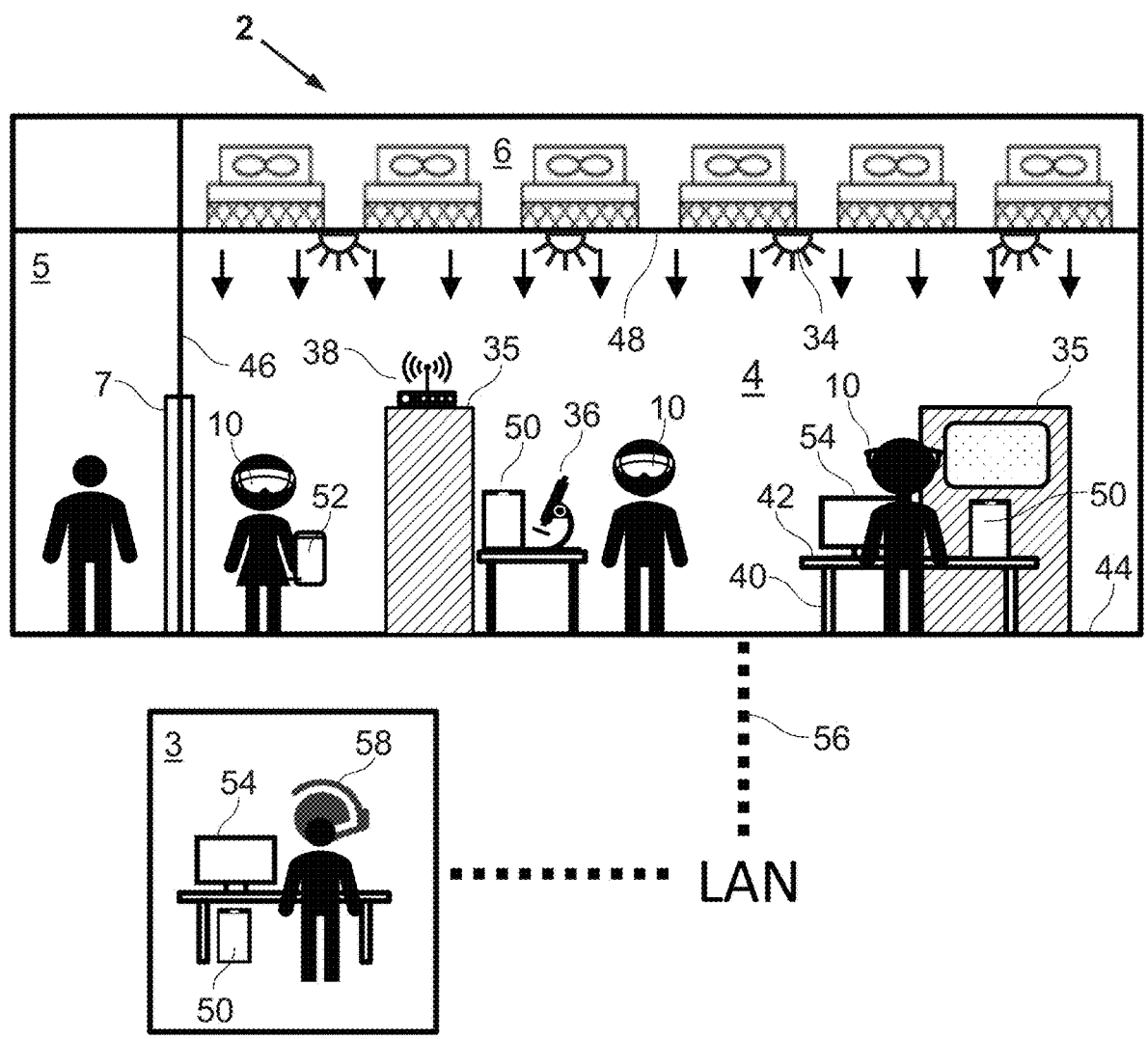
FIG. 11 is a schematic drawing of a clean room of a pharmaceutical manufacturing site and an office in the site.

FIG. 11 is a schematic drawing of a clean room 2 of a pharmaceutical manufacturing site or facility and an office 3 in the same site, where the computer equipment in the clean room 2 and the office 3 are in wireless or wired communication with each other through a common LAN. Alternatively, the office 3 could be at a remote location, in which case a WAN possibly including cloud components would be involved in connecting the office 3 to the clean room 2. The cleanroom 2 is shown with a clean area 4, an air lock and gowning area 5, the two being interconnected by an access door 7, and a ceiling duct area 6 where banks of filters are arranged. In the clean area 4, there are various pieces of manufacturing equipment 35 and instrumentation 36 as well as associated computer apparatus 50 and displays 54. A wireless router 38 is also shown which may enable various wireless-network enabled devices to communicate with each other and also to communicate externally, for example with network-enabled devices in the office 3 via a network connection 56 that provides a data communication channel between network nodes. The operators may also use handheld computer apparatuses 52 such as tablets or mobile phones. The clean area 4 also contains pieces of furniture 40, such as tables and cabinets, with surfaces 42 which may need to be cleaned as part of any cleaning protocol, e.g. together with the floor surfaces 44, wall surfaces 46 and/or ceiling surfaces 48. A triangulated network of static observation cameras 34 of the type familiar from CCTV are provided, whose fields of view overlap to allow for reliable tracking and hand-over between cameras, as may be provided for by wide-angle lenses. The observation cameras 34 are operable to support mapping of the cleanroom and tracking of the movement of operators, portable equipment and pharmaceutical product. The observation cameras 34 may be predominantly ceiling mounted as schematically illustrated or also mounted elsewhere as needed to provide complete coverage of the cleanroom. The office 3 is for a supervisor to monitor, audit and make release decisions in relation to the pharmaceutical manufacturing. The office 3 contains suitable computer equipment to allow a supervisor to complete these tasks. By way of example, we illustrate a computer apparatus 50, display 54 and headset 58 being worn by the supervisor. The headset may be an AR headset, but could also be a conventional headset consisting only of audio in/out channels, in which case the supervisor would rely on the display 54 for viewing image data.

Figure 12:
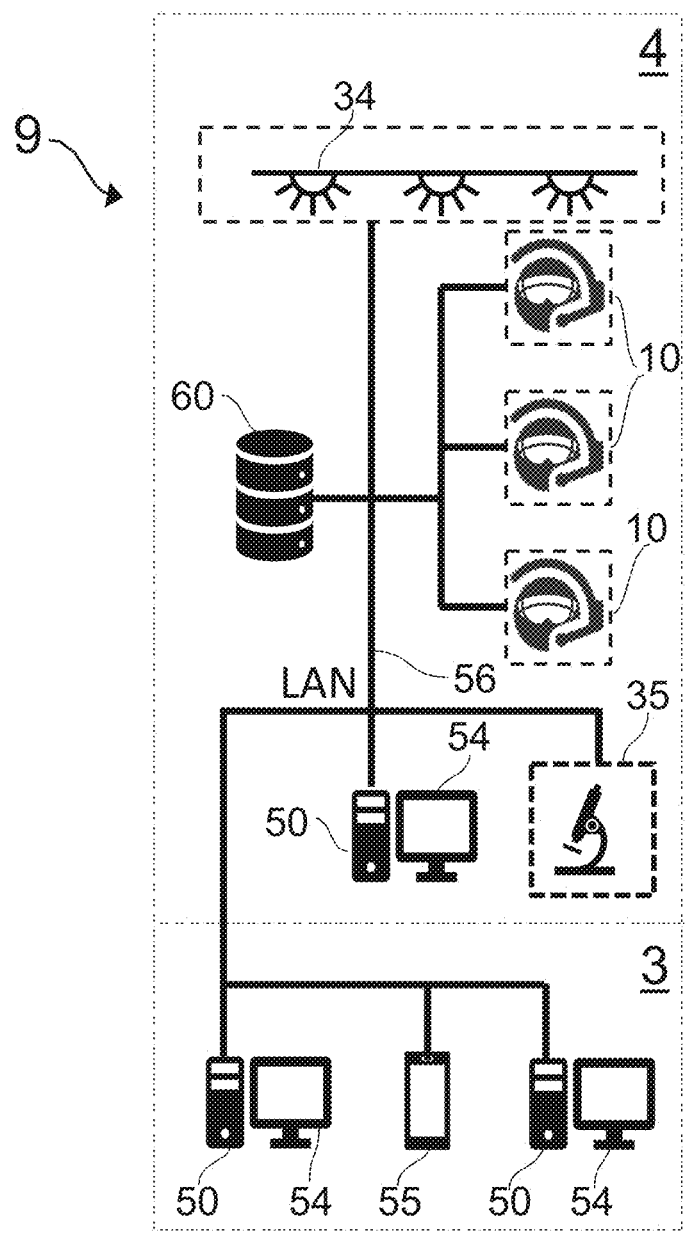
FIG. 12 is a schematic drawing of an example computer network including network nodes located in the cleanroom and in the office of a pharmaceutical manufacturing site as shown in FIG. 11.

FIG. 12 is a schematic drawing of an example computer network including network nodes located in the cleanroom 4 and in an office 3 of a pharmaceutical manufacturing site 9 as shown in FIG. 11 As well as the components already described, which are labelled with the same reference numerals, there is additionally shown servers 55 and a database 60. The servers may host data storage, which may be virtualised. The network may incorporate or be part of a laboratory information management system (LIMS). The manufacturing site 9 may be a radiopharmaceutical manufacturing site which serves one or more hospitals. The network may therefore be integrated with or be linked to a larger clinical network environment, such as a hospital information system (HIS) or picture archiving and communication system (PACS). At least some of the data used by or generated by the manufacturing site may include patient data, which may be retained in a patient information database containing the electronic medical records of individual patients. Barcode labels may be used in the manufacturing process, e.g. to label reagents, components such as filters or single-use plastics items, and batches of pharmaceutical product, by which the barcoded items are tagged with metadata. The AR headsets may incorporate local hardware and/or software to provide a barcode reading functionality. The image capture for the barcode reader may be through a general-purpose forward-facing camera on the AR headset or a specialist handheld unit available to the operator.

Manufacturing of pharmaceuticals is performed according to and controlled by formal regulations, instructing the operator on how to perform the tasks which collectively implement the chemical and physical steps leading to a finished pharmaceutical product. Such regulations are usually complied with through a Master Batch Record (MBR), a document generated by the holder of the Marketing Authorisation (MA) or the sponsor of a study to ensure compliance with established procedures, granted marketing approvals and sometimes also intellectual property licenses. Completion of an MBR during manufacturing of a batch is akin to filling out a complicated form full of check boxes and other entries. A completed MBR is referred to as a batch record (BR), i.e. a BR is a completed MBR for a specific batch. The BR has the role of documenting the full process from preparatory work via the setup of the campaign, the execution of the process, equipment cleaning procedures between batches or during a batch and dispensing procedures. The batch manufacturing process steps will typically comprise a mixture of chemical and physical process steps and verification steps for quality control, such as taking measurements. The measurements will include basic physical parameter measurements which, in the context of the present invention will include volume measurements of liquid contained in and then dispensed from syringes. Other measurements may include chromatographic or spectroscopic measurements or other complex analyses with specialist instruments. The measurements may also include other basic physical parameter measurements such as of weight, temperature, pressure or radioactivity level.

Figures 13A, 13B:
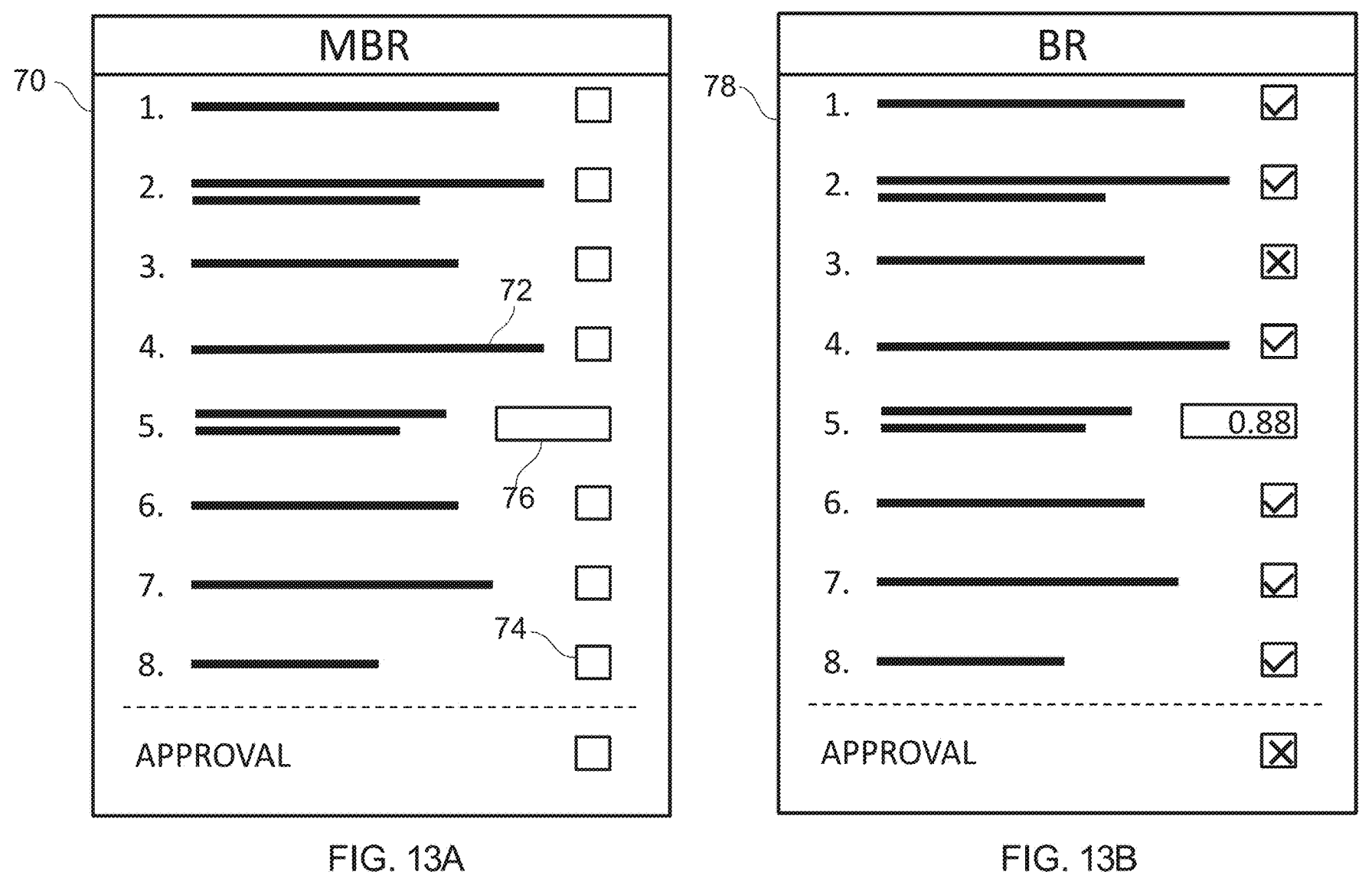

FIGS. 13A and 13B are simplified schematic representation of an MBR and a corresponding BR. An MBR is a document of key significance for manufacturing pharmaceutical products. The MBR is generated by the holder of the MA for the pharmaceutical product, or the sponsor of a study, to ensure compliance with established procedures, granted marketing approvals and sometimes also intellectual property licenses. The MBR serves as a template or form which is required to be completed or filled in when a batch of the pharmaceutical product is manufactured in order to document that the batch complies with what is specified in the MA and any other factors imposed by the originator of the MBR to certify that the batch is compliant with required practice. FIG. 13A is a simplified schematic representation of one part of an MBR 70 which comprises a sequential list of tasks (i.e. operator actions), labelled 1 to 8, each task carrying a descriptor 72, typically in text form, but possibly including some graphics elements, and a field 74, 76 for completion. The descriptor is thus a content item in the MBR relating to a specific one of the operator tasks or actions that alone or collectively with other operator tasks form a process step. Some fields may be check boxes 74 whereas other fields 76 may require entry of another variable type, such as a floating point or integer value relating to a measurement parameter such as a temperature, a weight or the number of units of a discrete item. In the context of the present invention, the measurement parameter will be a liquid volume contained in or dispensed from a syringe. There may also be a check box for approval after a sequence of tasks, which may relate to one step in the manufacturing process, e.g. that involved tasks 1-8 as illustrated, or may be for the whole manufacturing process after all the MBR has been worked through to create a completed BR. In the context of the present invention, the check box may relate to a measurement that a volume of liquid held in a syringe was measured to have been within specification before the liquid was dispensed. FIG. 13B shows a corresponding BR 78 in which the fields have been populated. By way of example, task 3 was not successfully completed as indicated by the cross, whereas the other tasks 1, 2, 4, 6, 7, 8 were successfully completed as indicated by the tick (check). In addition, an entry of 0.88 was made in the numeric field for task 5. A scalar quantity will be checked to see if it lies within a permitted range, whereas an integer quantity may either be specified in terms of a range of integer values or may require an exact integer value to be met. As a result of the unsuccessful completion of task 3, the approval check box is also crossed.

The fields in the BR are populated in embodiments of the invention by a combination of operator actions through the UI of the AR headset and automatic population through data logging performed as supported by the AR headset, e.g. through image processing of images captured by the AR headset. The UI of the AR headset has a GUI component which is configured to cooperate with non-augmenting overlay image data relating to the content of the MBR, whereby a plurality of user command inputs are provided which collectively enable the operator to navigate between fields of the MBR contained in the overlay image data being displayed and to populate the MBR fields with the appropriate entries. The UI thus allows the operator to work through completion of the BR in a stepwise manner. One UI command may be a confirmation command to populate a field 74 with an affirmation of task completion. The field 74 is envisaged to be associated with a discrete valued parameter. Such a field may for example be binary (e.g. not yet done/done) or may be tri-state (e.g. not yet done, successfully done, unsuccessfully done). Another UI command may be a numeric value entry command to populate a field 76 with a number.

Figure 14:
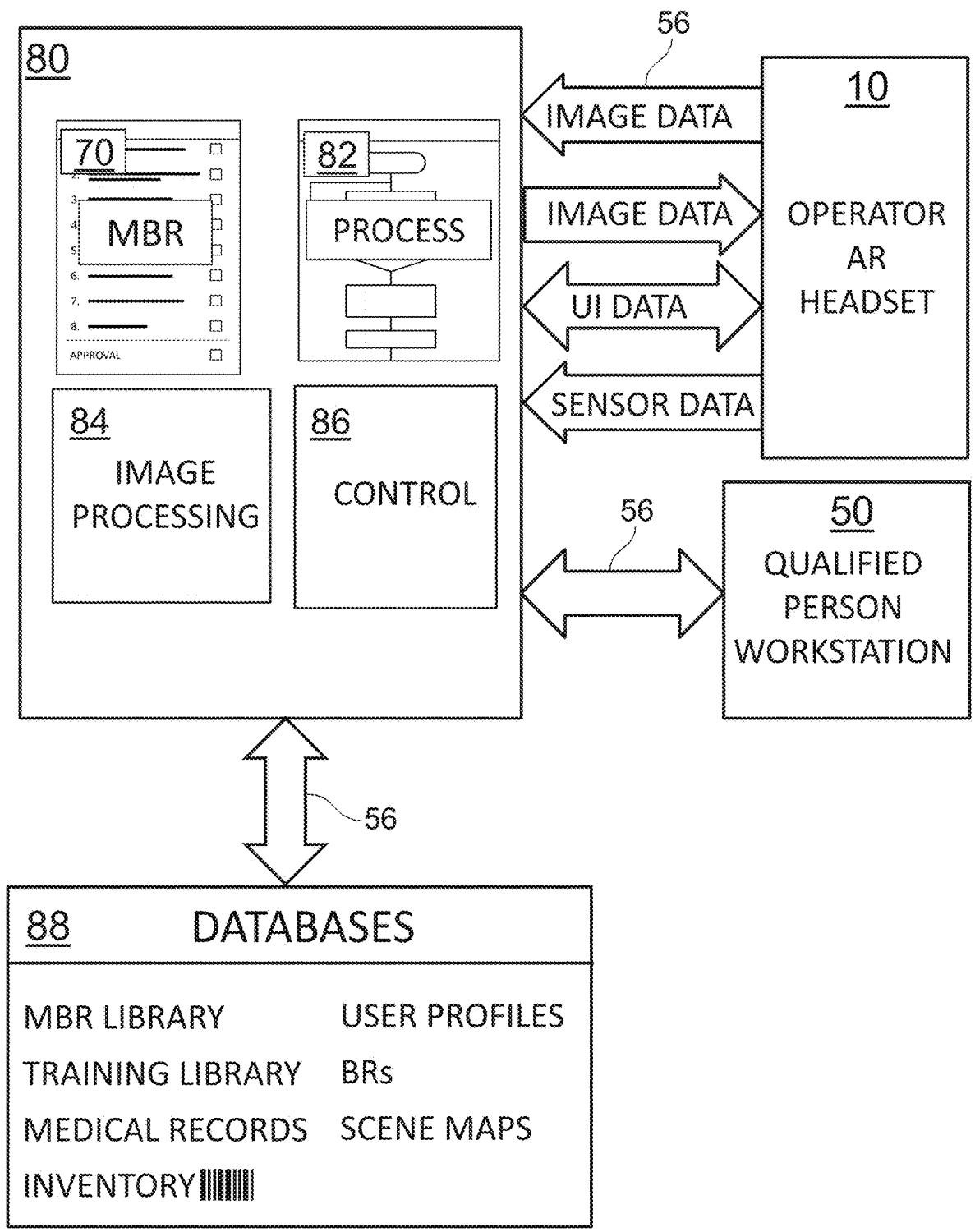
FIG. 14 is a block diagram of applications, data structures and functional units hosted by the computer network of FIG. 12.

FIG. 14 is a block diagram of applications, data structures and functional units hosted by the computer network of FIG. 12. A computer application 80 is hosted by and run on a server as shown in FIG. 12. The computer application 80 provides electronic record management system software for an MBR 70, e.g. batch record management system software for managing the MBR and the BR. To manufacture a pharmaceutical product of interest, the relevant MBR is loaded into the computer application 80. The manufacturing process underlying the pharmaceutical product manufacture is defined in a data structure 82 which is a process flow with sequences of tasks, conditional branches and so forth which is also loaded in the computer application 80. Embedded in the data structure of the process flow are mappings between, including time synchronisations, between populating the MBR fields in the data logging steps and undertaking the operator actions according to the process flow. Embedded in the data structure of the process flow or as tags added to the MBR are also criticality gradings for the operator tasks in the MBR. The gradings may have two or more levels, e.g. 3 or 4 levels. When generating a non-augmented overlay image for an AR headset to display content (e.g. descriptor and field) for a particular task, the criticality grading can be used to modify how said content is rendered on the display apparatus. Visually perceptible markings on task-specific content can be used to distinguish between content having regard to the criticality grading associated with the task, e.g. with highlighting and/or a colour scheme and/or use of bold type or underlining in order that more critical tasks are emphasised to the operator.

The computer application 80 also includes a diverse suite of image processing functionalities 84 to support interaction of the computer application 80 with an AR headset 10 being worn by an operator as well as with a workstation 50 for a qualified person (QP) responsible for approvals and ultimate batch release. These image processing functionalities are described in more detail further below. The computer application 80 further includes a control module 86 which has the function of coordinating the other elements 70, 82, 84 of the computer application 80 with the external components associated with operators, QPs and database read and write actions, including taking account of the mappings in the process flow to synchronize with stepping through the MBR fields. The computer application 80 is configured to generate overlay image data relating to tasks selected from the MBR in synchronisation with progression of the operator through these tasks. For this purpose, the computer application causes suitable overlay image data to be loaded onto the AR headset for the operator. The overlay images may be a combination of augmenting and non-augmenting overlay images.

The computer application 80 and its underlying host computer system, e.g. 55, being in operative communication with the AR headset 10 via data communication channel, e.g. 56. FIG. 14 shows schematically some of the more important data communication functions carried out between the computer application 80 and the AR headsets 10 being used by operators in the cleanroom. Image data is sent to the AR headset for display to the wearer through the display apparatus. Image data is sent from the AR headset as output from the camera(s) mounted on the AR headset. UI data passes both ways between the computer application and the AR headset. Sensor data passes from the AR headset (or from ancillary devices) to the computer application. The computer application 80 also has access to a suite of databases 88 via a data communication channel 56. The databases are schematically shown in a single functional bloc, but each of the listed items will usually be in an independent database which may be hosted in different physical servers or virtual servers, e.g. 60, or share storage resource, or be combined into a single database. The listed databases are as follows.

There is a library of MBRs, one for each pharmaceutical product that may be manufactured in a particular manufacturing site or any manufacturing site of an entity with multiple manufacturing sites.

There is a training library where units of training materials are stored. The training units may be based on multimedia content including one or more of video clips, individual stills images, sequences of stills images, e.g. in comic-book format, audio and text. Each training unit may be associated with a specific operator action (task) or group of operator actions (process step). Metadata tagged to the MBR 70 or embedded in the process data structure 82 or contained in the control module 86 may link to specific training units, so that the computer application 80 when run is operable to play training units on the AR headset selected in synchronisation with progression through the operator actions and optionally other factors such as with reference to the user profile of the operator.

The training units include metadata enabling a training management algorithm to decide at run time whether that training unit should be offered or mandated (for example with reference to the operator profile, or the mode of operation, e.g. training mode or manufacturing mode, or responsive to the actual operator actions that are being carried out, e.g. if the operator has spent too long on an action or group of actions that may be taken as an indicator that the operator needs assistance).

The AR headset's UI may be provided with user commands to enable non-mandatory training units to be offered to the operator and to be accepted or refused by the operator by issuing these commands.

The control module 86 may also support an operator training mode which includes enhanced use of the training units from the training library. The training mode may additionally make use of an operator scoring unit in which metrics logging performance of an operator are collected and which is configured to provide pass/fail gradings of a manufacturing process, or a group of operator actions within a manufacturing process, on which the operator is being trained.

There may be a medical records database holding patient data. This may be remotely hosted on a different site, e.g. as part of a PACS hospital network, but may allow controlled access to the computer application, if only to allow, for example, ordering information from patient records to be accessed by the computer application, so that the computer application can collect orders, e.g. to manufacture a batch of radiopharmaceutical product for all patients scheduled for a particular type of scan on that day.

There is an inventory database for all raw materials, such as reagents, and also for batches of finished or semi-finished pharmaceutical products, and any other items that need to be tracked, e.g. waste vials. Tracking is conventionally done through barcodes. The inventory database may therefore provide a lookup facility for a barcode reader. For example, each reagent vial, waste vial, and product vial may be labelled with a barcode. Consumable items, such as well plates and microscope slides may also be barcoded. The barcode scanning may be integrated in the AR headset using the forward-facing camera or done with a separate barcode reader. Metadata associated with the barcode is held in the inventory database, such as nature of product, expiry date/time of product, manufacturer/supplier of a raw material etc.

There is another database for user profiles. For example, there may be standard user profiles for different types of worker, such as for an operator who works in the cleanroom to perform manufacturing tasks (e.g. subdivided as trainee, regular, expert/supervisor) and for a QP responsible for approvals and ultimate batch release (e.g. subdivided by approval authorisation grade). In addition, the user profiles may be personalised so that each individual staff member has his/her own profile. An operator profile may then be personalised by factors such as operator skill, operator track-record (e.g. as measured by performance metrics such as speed and reliability), operator training modules that have been completed.

When generating the above-mentioned non-augmented overlay image for an AR headset to display content (e.g. descriptor and field) for a particular task, how said content is rendered on the display apparatus can be modified not only having regard to the criticality grading, but also having regard to the combination of criticality grading and user profile, e.g. to take account of operator skill attributes and/or operator track-record as stored in the user profile. For example, the system may largely refrain from any highlighting of tasks for an expert operator. On the other hand, if a personalised user profile shows that a particular operator has a track-record of unreliability with a particular task, then this can be highlighted even if it would not be for a regular operator with a similar general skill level.

The BRs of manufactured batches are also stored in a database.

It will be clear to one skilled in the art that many improvements and modifications can be made to the foregoing exemplary embodiments without departing from the scope of the present disclosure.

REFERENCE NUMERALS

- 100 Syringe
- 110 Barrel
- 111 Barrel tip (luer connection)
- 112 Barrel flange
- 113 Barrel scale marks
- 114 Barrel inner cylindrical surface
- 115 Barrel outer cylindrical surface
- 116 Bottom (external) surface of syringe barrel
- 117 Tip outlet channel (aperture) from bottom of syringe barrel
- 120 Plunger
- 121 Plunger main body
- 122 Plunger flange
- 123 Plunger stopper
- 124 Stopper upper sealing surface
- 125 Stopper lower sealing surface
- 130 Synthesis module
- 131 Cassette
- 132 Valve (e.g. two-way, three-way, four-way)
- 133 Liquid connection line (e.g. tube)
- 134 Vial
- 140 Tapered slot
- 141 Slot rails
- 142 Slot rail inner surfaces
- 146 Back board
- 147 Base board
- 148 Fixed camera

The invention claimed is:

1. A method of measuring the volume of liquid contained in a syringe comprising a barrel with a barrel flange and a barrel bottom surface, and a plunger with a plunger flange, the method comprising:
    providing a dataset storing, for each of a number of syringe models, syringe manufacturer, nominally specified syringe volume, at least one length dimension and at least one calibration value to permit the volume of liquid contained in each syringe model to be computed as a function of plunger position in the barrel;
    presenting the syringe to an image acquisition device;
    capturing an image of the syringe with the image acquisition device;
    computer processing the image to determine a length dimension of the syringe and to identify the plunger position, wherein the plunger position is determined by computer processing the image to identify the plunger flange and either the barrel flange or the barrel bottom surface and then determining the distance therebetween;
    referring to the dataset to identify the syringe model based on the length dimension; and
    referring to the dataset to obtain the calibration values for the identified syringe model and then to determine the volume of liquid contained in the syringe from the plunger position and interpolation between the calibration values.

2. The method of claim 1, further comprising:
    outputting the determined volume of liquid.

3. Method of claim 1, wherein the syringe model is determined with reference to the dataset from the length dimension and the syringe manufacturer is determined from the syringe model.

4. The method of claim 1, wherein the syringe manufacturer is provided by a data input and the syringe model is determined with reference to the dataset from the input syringe manufacturer and the length dimension.

5. The method of claim 1, further comprising:
    outputting the syringe model and syringe manufacturer.

6. The method of claim 1, wherein the image acquisition device comprises a camera having a field of view and wherein said presenting the syringe to an image acquisition device and said capturing an image of the syringe with the image acquisition device comprises holding the syringe in a syringe holder within the field of view of the camera.

7. The method of claim 6, wherein said holding the syringe in a syringe holder within the field of view of the camera comprises holding the syringe in front of a back board so that the image that is captured by the camera is of the syringe with the back board as a contrast-providing background.

8. The method of claim 1, wherein the length dimension used to identify the syringe model is one of: plunger flange diameter, barrel flange diameter and barrel outside diameter.

9. The method of claim 1, wherein each calibration value stored in the dataset for a particular syringe model represents a volume of liquid contained in the syringe at a specific plunger position.

10. The method of claim 9, wherein there is a calibration value corresponding to the plunger position being withdrawn to where the syringe is filled to its nominally specified syringe volume or at least half thereof.

11. The method of claim 9, wherein there is a calibration value corresponding to the plunger position being fully depressed in the barrel.

12. The method of claim 1, wherein the syringe is presented to the image acquisition device by holding the syringe in a measurement device configured to hold a syringe in a position that depends on the syringe's outside diameter, the length dimension being the syringe barrel's outside diameter.

13. The method of any of claim 12, wherein the measurement device comprises a slot of tapering width formed by an opposing pair of rails into which the syringe barrel is slidable until it stops at a stop position part way along the slot as a result of the syringe barrel outside surface coming into tangential contact with each of the rails at one point on their inner surfaces.

14. A non-transitory computer readable medium storing instructions for outputting the volume of liquid contained in a syringe comprising a barrel with a barrel flange and a barrel bottom surface, and a plunger with a plunger flange, the instructions comprising:

one or more instructions which, when executed by one or more processors, cause the one or more processors to:

provide a dataset storing, for each of a number of syringe models, syringe manufacturer, nominally specified syringe volume, at least one length dimension and at least one calibration value to permit the volume of liquid contained in each syringe model to be computed as a function of plunger position in the barrel;

input an image of the syringe captured with an image acquisition device;

process the image to determine a length dimension of the syringe and to identify the plunger position, wherein the plunger position is identified by computer processing the image to identify the plunger flange and either the barrel flange or the barrel bottom surface and then determining the distance therebetween;

refer to the dataset to identify the syringe model based on the length dimension; and refer to the dataset to obtain the calibration values for the identified syringe model and then to determine the volume of liquid contained in the syringe from the plunger position and interpolation between the calibration values.

15. A test apparatus for measuring the volume of liquid contained in a syringe comprising a barrel with a barrel flange and a barrel bottom surface, and a plunger with a plunger flange, the test apparatus comprising:

a memory storing a dataset containing, for each of a number of syringe models, syringe manufacturer, nominally specified syringe volume, at least one length dimension and at least one calibration value to permit the volume of liquid contained in each syringe model to be computed as a function of plunger position in the barrel;

an image acquisition device operable to capture an image of the syringe; and a processor operable to:

input an image of the syringe captured with an image acquisition device;

process the image to determine a length dimension of the syringe and to identify the plunger position, wherein the plunger position is identified by computer processing the image to identify the plunger flange and either the barrel flange or the barrel bottom surface and then determining the distance therebetween;

refer to the dataset to identify the syringe model based on the length dimension;

refer to the dataset to obtain the calibration values for the identified syringe model; and determine the volume of liquid contained in the syringe from the plunger position and interpolation between the calibration values; and output the determined volume of liquid.

16. The test apparatus of claim 15, wherein the image acquisition device comprises a camera having a field of view and wherein the test apparatus further comprises a syringe holder configured to hold a syringe within the field of view of the camera.

17. The test apparatus of claim 16, further comprising a back board positioned such that it forms a contrast-providing background for images acquired of a syringe held in the syringe holder as captured by the camera.

18. The test apparatus of claim 15, wherein the syringe holder further functions as part of a measurement device for determining the syringe barrel's outside diameter, the syringe holder being configured to hold a syringe in a position such that the syringe's position in the image captured by the image acquisition device depends on the syringe's outside diameter, wherein measurement data for determining the syringe barrel's outside diameter is contained in the image, wherein the processor is operable to determine the syringe barrel's outside diameter by further processing the captured image.

19. The test apparatus of claim 18, wherein the outside diameter measurement device comprises a slot of tapering width formed by an opposing pair of rails into which a syringe is slidable until it stops at a stop position part way along the slot as a result of the syringe barrel outside surface coming into tangential contact with each of the rails at one point on their inner surfaces.

* * * * *